(12) United States Patent
Palmer et al.

(10) Patent No.: US 7,594,764 B2
(45) Date of Patent: Sep. 29, 2009

(54) FIELD-INSTALLABLE FUSION SPLICED FIBER OPTIC CONNECTOR KITS AND METHODS THEREFOR

(75) Inventors: Jeffrey D. Palmer, Ft. Worth, TX (US); Jason F. Forsberg, Denton, TX (US); Kevin C. Beach, N. Richland Hills, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/788,996

(22) Filed: Apr. 23, 2007

(65) Prior Publication Data

US 2007/0196054 A1    Aug. 23, 2007

Related U.S. Application Data

(63) Continuation of application No. 10/811,750, filed on Mar. 29, 2004, now abandoned.

(51) Int. Cl.
*G02B 6/36* (2006.01)
*G02B 6/38* (2006.01)
*G02B 6/00* (2006.01)

(52) U.S. Cl. .............................. 385/53; 385/62; 385/134
(58) Field of Classification Search .................... 385/53, 385/62, 134
See application file for complete search history.

(56) References Cited

U.S. PATENT DOCUMENTS

| | | | | |
|---|---|---|---|---|
| 3,904,269 A | * | 9/1975 | Lebduska et al. | 385/54 |
| 4,233,724 A | * | 11/1980 | Bowen et al. | 29/428 |
| 4,257,546 A | | 3/1981 | Benasutti | 225/96.5 |
| 4,553,814 A | * | 11/1985 | Bahl et al. | 385/86 |
| 4,602,845 A | | 7/1986 | Anderton | 350/96.2 |
| 4,619,387 A | | 10/1986 | Shank et al. | 225/96.5 |
| 4,712,861 A | | 12/1987 | Lukas et al. | 350/96.21 |
| 4,752,111 A | * | 6/1988 | Fisher | 385/55 |
| 4,787,697 A | | 11/1988 | Alrutz et al. | 350/96.2 |
| 4,877,303 A | | 10/1989 | Caldwell et al. | 350/96.21 |
| 5,018,818 A | | 5/1991 | Barlow et al. | 350/96.2 |
| 5,040,867 A | | 8/1991 | deJong et al. | 385/60 |
| 5,077,880 A | | 1/1992 | Dean et al. | 29/281.5 |
| 5,151,961 A | | 9/1992 | Hvezda et al. | 385/60 |
| 5,160,569 A | | 11/1992 | Ott et al. | 156/439 |
| 5,222,169 A | | 6/1993 | Chang et al. | 385/87 |
| 5,261,020 A | | 11/1993 | deJong et al. | 385/76 |
| 5,363,459 A | | 11/1994 | Hultermans | 385/60 |
| 5,367,594 A | * | 11/1994 | Essert et al. | 385/70 |
| 5,666,456 A | | 9/1997 | Merriken | 385/134 |
| 5,748,819 A | * | 5/1998 | Szentesi et al. | 385/60 |
| 5,971,624 A | * | 10/1999 | Giebel et al. | 385/59 |
| 6,019,521 A | | 2/2000 | Manning et al. | 385/77 |

(Continued)

FOREIGN PATENT DOCUMENTS

EP      1184695 A1     3/2002

*Primary Examiner*—K. Cyrus Kianni

(57) ABSTRACT

A field-installable fusion spliced optical fiber connector including a ferrule, a fiber stub, a splice cover defining a longitudinal passage therethrough, a crimp body coupled to the splice cover, a biasing spring and a connector housing. A ferrule handling block is used for handling the ferrule during connector assembly and a splice cover handling block is used for handling the crimp body, the splice cover and the spring during connector assembly. A fusion splice point of the fiber optic stub and a field fiber is positioned within the longitudinal passage of the splice cover. A method for assembling a field-installable fusion spliced optical fiber connector.

5 Claims, 20 Drawing Sheets

U.S. PATENT DOCUMENTS

| | | | |
|---|---|---|---|
| 6,068,410 A | 5/2000 | Giebel et al. | 385/72 |
| 6,173,097 B1 | 1/2001 | Throckmorton et al. | 385/59 |
| 6,238,104 B1 | 5/2001 | Yamakawa et al. | 385/87 |
| 6,379,054 B2 | 4/2002 | Throckmorton et al. | 385/66 |
| 6,439,780 B1 | 8/2002 | Mudd et al. | 385/83 |
| 6,623,172 B1 | 9/2003 | deJong et al. | 385/59 |
| 6,715,933 B1 | 4/2004 | Zimmer et al. | 385/86 |
| 2001/0002220 A1* | 5/2001 | Throckmorton et al. | 385/66 |
| 2003/0231839 A1* | 12/2003 | Chen et al. | 385/78 |
| 2004/0057676 A1* | 3/2004 | Doss et al. | 385/81 |
| 2005/0094945 A1* | 5/2005 | Danley et al. | 385/78 |
| 2005/0213890 A1* | 9/2005 | Barnes et al. | 385/55 |

* cited by examiner

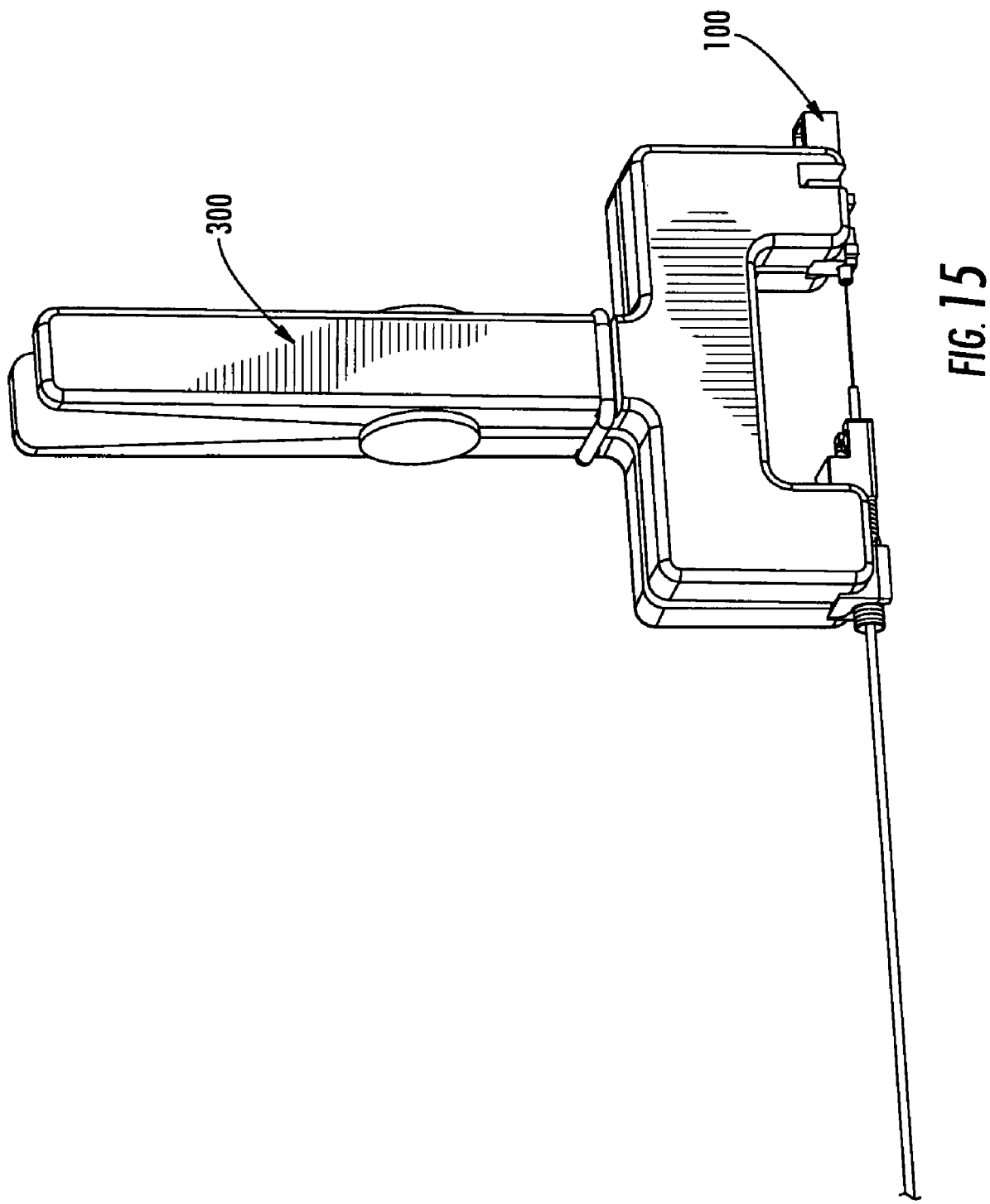

US 7,594,764 B2

FIELD-INSTALLABLE FUSION SPLICED FIBER OPTIC CONNECTOR KITS AND METHODS THEREFOR

CROSS-REFERENCE TO RELATED APPLICATION

The present application is a Continuation of application Ser. No. 10/811,750 filed Mar. 29, 2004 now abandoned by Palmer et al. and titled "Field-Installable Fusion Spliced Fiber Optic Connector Kits and Methods Therefor."

FIELD OF THE INVENTION

The present invention relates generally to fiber optic connector kits and methods therefor. More specifically, the invention relates to field-installable fusion spliced fiber optic connectors and methods therefor.

BACKGROUND OF THE INVENTION

Communication networks are used to transport a variety of signals such as voice, video, data transmission, and the like. One common way to connect optical waveguides is by using optical connectors. Optical connectors hold the mating optical waveguides in respective ferrules of the mating connectors. The ferrules and optical waveguides therein require polishing of the end face for proper operation. Polishing a ferrule is a relatively complex process that generally requires several steps along with inspection and testing using precision equipment to verify that the connector has an acceptable optical performance. In other words, polishing ferrules and testing optical performance is best performed in a factory setting under ideal working conditions.

When both ends of a cable are connectorized in the factory, the cable ends up having a predetermined length. Unfortunately, in the field a particular application for the cable may not require the entire predetermined length of the jumper cable, thereby creating excess cable length. This excess cable length can cause problems. For instance, the excess length of the cable must be stored within the enclosure or rack, which holds a plurality of cables. Generally speaking, the space within the enclosure or rack is generally at a premium, thus it is difficult and time consuming to store the excess cable length. Moreover, storing excess cable length leads to unorganized or undesirable housekeeping issues within the enclosure or rack. Thus, cables preferably have a length that is tailored for the particular application for an orderly and organized installation.

One way of tailoring the length of a cable for an application is to connectorize the cable in the field. One known method of field installing a connector so the cable has a tailored length uses a factory polished connector having an optical fiber pigtail. Using a connector having a pigtail attached requires cutting the cable to length and fusion splicing the pigtail to an optical fiber of the cable in the field. Although this method tailors the length of the cable it requires extra components such as furcation tubing to protect the pigtail and shrink tubing for immobilizing the optical splice. Moreover, these components require the craftsman to perform extra steps that increase the installation time for the connector. Other drawbacks of this method include a larger cable diameter at the location of the splice and a lack of flexibility about the splice location, thereby making routing and storage cumbersome and difficult.

Optical connectors have been designed to overcome the drawbacks of optical connectors having pigtails. An example of an optical connector that overcomes these problems is disclosed in U.S. Pat. No. 5,748,819. This optical connector has a ferrule with a longitudinal bore running between a first end and a second end with a fusion access means defined within the ferrule. The ferrule also includes an optical fiber stub disposed within a portion of the ferrule. Specifically, the optical fiber stub is polished at the first end of the ferrule and extends into and terminates within the fusion access means of the ferrule. During field-installation, the cable is cut to the appropriate length and an optical fiber of the cable is inserted from the second end of the ferrule into the fusion access means to align it with the optical fiber stub for fusion splicing. Consequently, the fusion splice is disposed within the ferrule, thereby eliminating some of the problems associated with having the splice location in a medial portion of the cable as with the connector having a pigtail. But this connector design has limitations since forming the fusion access means within the ferrule removes ferrule material and alters the structural integrity of the ferrule.

For instance, there is a need for connectors having a smaller form factor, thereby increasing the connection density in patch panels and other like installations. These smaller form factor connectors require ferrules with smaller diameters to miniaturize the connector footprint. Accordingly, ferrules having smaller diameters will not have enough ferrule material remaining if a fusion access means is formed therein. In other words, a fusion access means is not feasible for these small form factor connectors.

BRIEF DESCRIPTION OF THE FIGURES

FIG. 15 is a perspective view of the transfer tool of FIG. 14 gripping a portion of the assembly of FIG. 6e.

DETAILED DESCRIPTION OF THE INVENTION

Figure 1:
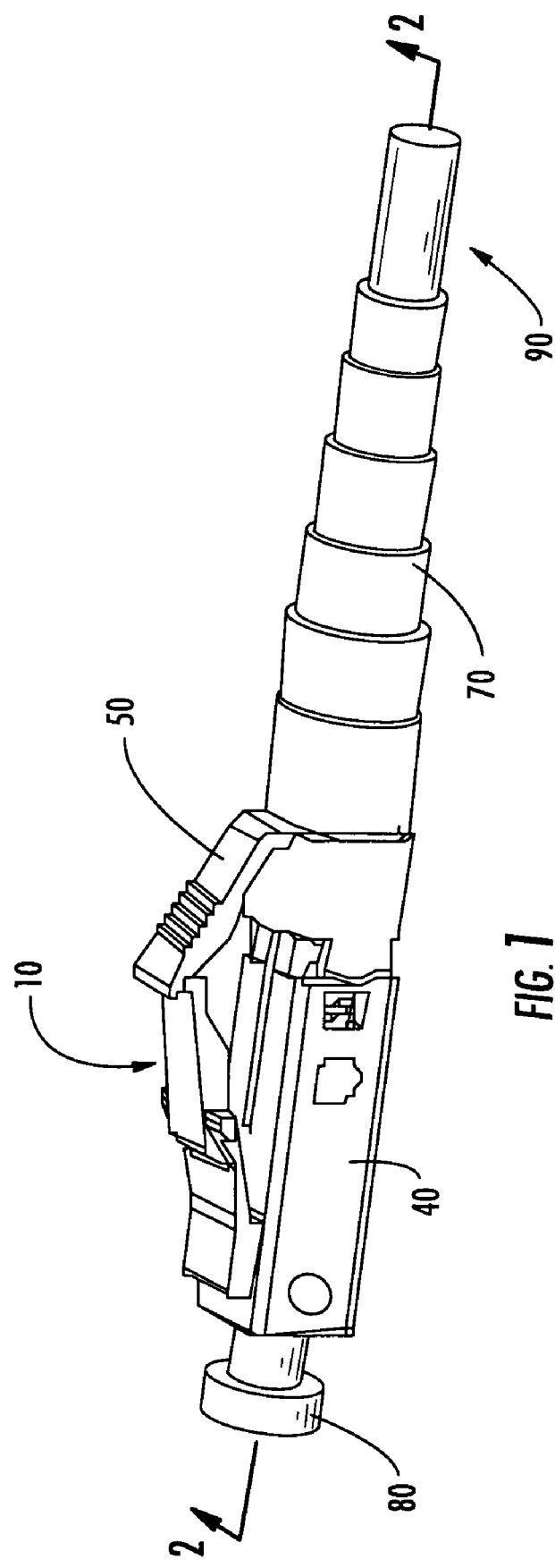
FIG. 1 is an assembled perspective view of an optical connector according to the present invention that is installed on an end of an optical cable.

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawing are not necessarily drawn to scale but are configured to clearly illustrate the invention.

Figure 2:
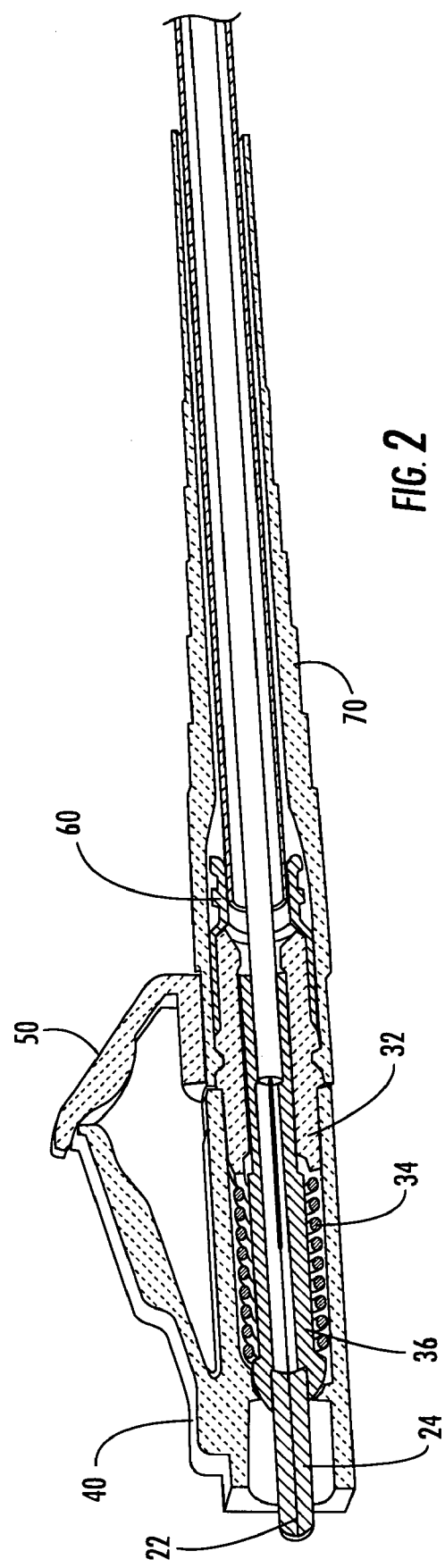
FIG. 2 is a cross-sectional view of the optical connector taken along line 2-2 as shown in FIG. 1.

FIG. 1 depicts an assembled perspective view of an exemplary fiber optic connector 10 (hereinafter connector 10) attached to a fiber optic cable 90 (hereinafter cable 90) with a dust cap 80 thereon according to the present invention. FIG. 2 depicts a cross-sectional view of connector 10 taken along section line 2-2. Connector 10 is suitable for field installation so that the length of the cable may be tailored for the specific application. Specifically, connector 10 is suitable for fusion splicing in the field and when assembled a fusion splice is advantageously disposed within connector 10. In other words, since the splice is disposed within connector 10, the body of the cable is not affected by connectorization, therefore, the routing and storage of the associated cable is not affected like connectors having pigtails attached. Furthermore, the splice of connector 10 is disposed within connector 10 so that the structural integrity of a ferrule of connector 10 is not compromised. Since the structural integrity of the ferrule is not compromised, connector 10 is suitable for small form factor configurations as discussed herein.

Figure 3:
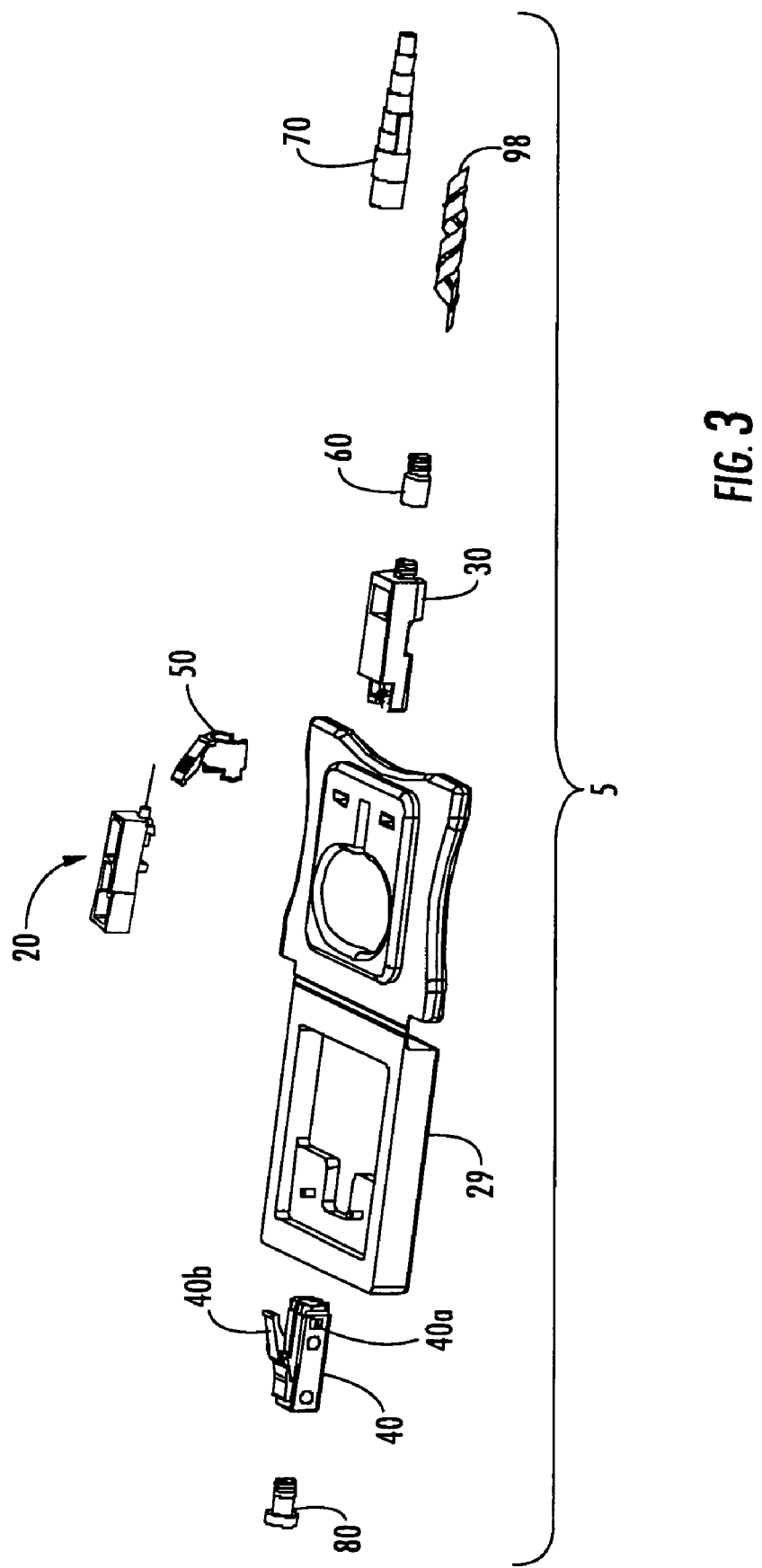
FIG. 3 is a partially exploded view of a component kit for the optical connector of FIG. 1.

FIG. 3 is a partially exploded view of an exemplary component kit 5 for connector 10 before the assembly. As shown in FIG. 3, component kit 5 for connector 10 includes a ferrule block subassembly 20, a splice cover handling block subassembly 30, a housing 40, a trigger 50, a crimp band 60, a boot 70, dust cap 80, and a twist tie 98. Ferrule block subassembly 20 includes a disposable ferrule handling block 28 that does not form a portion of the assembled connector 10, but rather is used during assembly of connector 10 as explained herein. Likewise, splice cover handling block subassembly 30 includes a disposable splice cover handling block 38 that does not form a portion of the assembled connector 10, but rather is used during assembly of connector 10 as explained herein.

Figure 4:
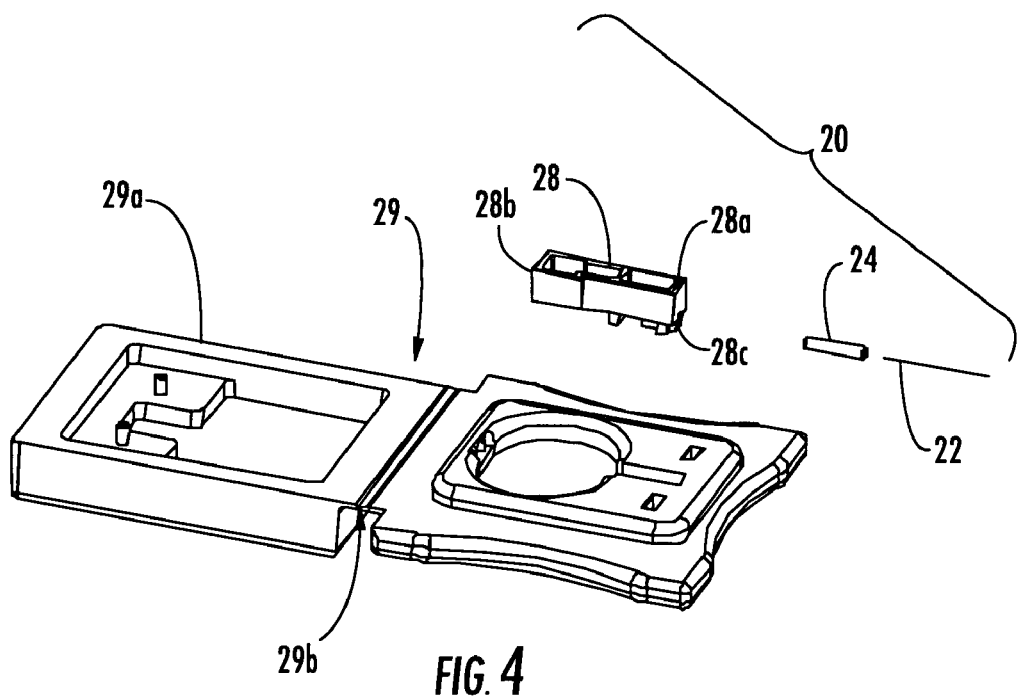
FIG. 4 is an exploded view of the ferrule block subassembly of FIG. 3 along with a container for holding and protecting the same during shipping according to the present invention.

FIG. 4 is an exploded view of ferrule block subassembly 20 of FIG. 3. Ferrule block subassembly 20 includes a fiber optic stub 22, a ferrule 24, and disposable ferrule handling block 28. Fiber optic stub 22 is formed from any suitable optical waveguide and is longer than ferrule 24. Fiber optic stub 22 preferably has its coating(s) removed, thereby leaving a core and a cladding so that it is ready for fusion splicing with an optical waveguide 90a of cable 90 in the field.

Figure 4A:
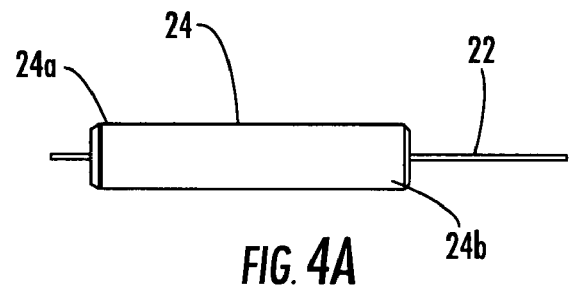
FIG. 4a is a perspective view of a ferrule subassembly of FIG. 4 before polishing has been performed.

Ferrule 24 has a longitudinal bore that extends from a first end 24a to second end 24b and the bore diameter is suitably sized for receiving fiber optic stub 22 therein. As shown in FIG. 4a, fiber optic stub 22 of a suitable cleaved length is inserted into the longitudinal bore of ferrule 24 so that a portion of fiber optic stub 22 extends beyond both first end 24a and second end 24b. Thereafter, fiber optic stub 22 is attached to ferrule 24 using a suitable adhesive such as a curable epoxy. After the epoxy sets the portion of optical fiber stub 22 extending beyond first end 24a of ferrule 24 is cleaved if necessary. Thereafter, the first end 24a of ferrule 24 and fiber optic stub 22 are polished as is known to one skilled in the art. Polishing forms a surface on the ferrule subassembly (not numbered) that is suitable for optical connection.

Optical fiber stub 22 extends beyond second end 24b of ferrule 24 so that the fusion splice is disposed downstream of ferrule 24, but the splice of optical connector 10 is still advantageously disposed within connector 10. Stated another way, the design of the connector according to the present invention does not affect the structural integrity of the ferrule as in other field installable connector designs.

By way of example, a suitable length of optical fiber stub 22 for insertion into ferrule 22 is about 10 millimeters for a ferrule having a length of about 6.5 millimeters. In this case, ferrule 24 has an outer diameter of about 1.25 millimeters that is configured for small form factor connectors; however, the concepts of the present invention may be used with any suitably sized ferrule. Ferrule 24 may be formed from any suitable material such as ceramics, metals, glass, or composite materials. Ferrule 24 can also have any suitable configuration such as an angled physical contact (APC), ultra physical contact UPC, pencil tip configurations, or other suitable configurations. Likewise, other single fiber small-form factor connectors such as MU can incorporated the concepts of the present invention; however, the concepts are not limited to small form-factor connectors, nor are they limited to single fiber connectors. The concepts of the present invention are suitable with multi-fiber connectors such as MT-RJ or MTP connectors.

Ferrule block subassembly 20 also includes a disposable ferrule handling block 28 as a portion of a kit for connector 10. Disposable ferrule handling block serves several functions for field-installable connector 10, but does not form a portion of the assembled connector 10 as shown in FIG. 1. Disposable ferrule handling block 28 is used for holding and handling the ferrule subassembly (not numbered) during the installation process since it is relatively small and difficult for a craftsman to handle.

Disposable ferrule handling block 28 includes a first end 28a and a second end 28b. As shown, first end 28a includes a suitable sized longitudinal bore 28c for removably inserting the ferrule subassembly. FIG. 4 illustrates a container 29 for housing and protecting ferrule block subassembly 20 during shipping and prior to assembly of the connector 10. Container 29 is advantageous since it protects the relatively fragile optical fiber stub 22 that is cantilevered beyond ferrule 24. Ferrule block subassembly 20 preferably has a friction fit within container 29 so that it does not inadvertently fall out. In the illustrated embodiment, container 29 has a living hinge 29b so that ferrule block subassembly 20 is disposed within the container when a lid 29a is closed.

Figure 5:
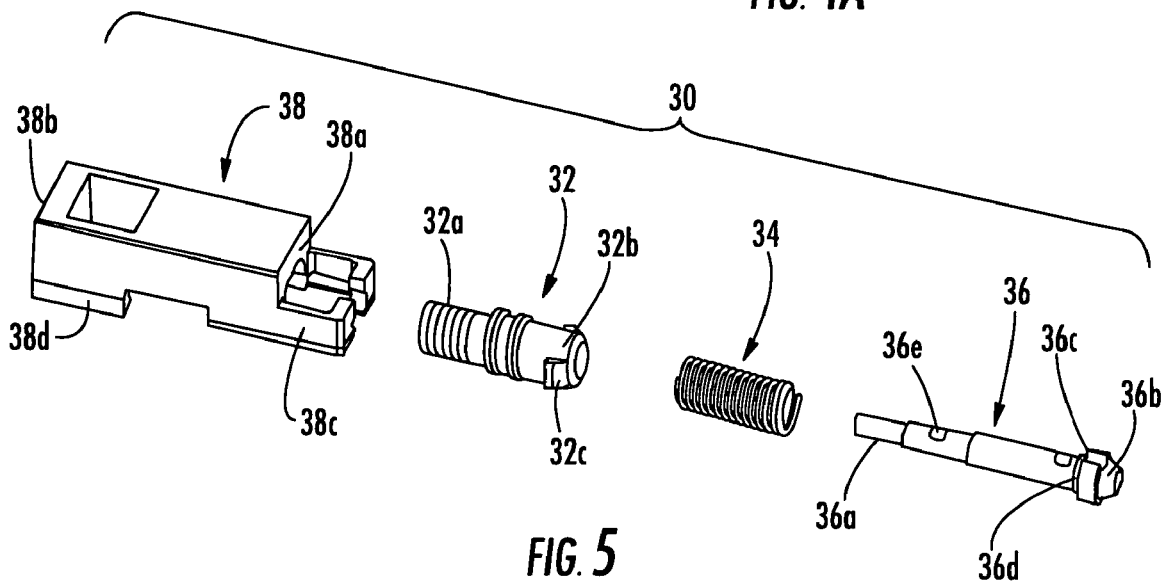
FIG. 5 is an exploded view of the splice cover handling block subassembly of FIG. 3.

FIG. 5 is an exploded view of splice cover handling block subassembly 30 of FIG. 3. Splice cover handling block subassembly 30 includes a crimp body 32, a spring 34, a splice cover 36, and a disposable splice cover handling block 38. Crimp body 32 includes a first end 32a and a second 32b with a longitudinal passage therebetween. First end 32a is sized so that crimp band 60 can fit thereover as shown in FIG. 2. Additionally, first end 32a includes a plurality of ridges (not numbered) for securing strength members between crimp body 32 and crimp band if necessary for strain relief. Second end 32b of crimp body 32 has protrusions 32c used for securing housing 40 onto connector 10. Specifically, when housing 40 is installed protrusions 32c engage complementary windows 40a on housing 40, thereby securing housing on connector 10. The rearward ridge of crimp body 32 can also include a notch (not visible) that is located at about 90 degrees from both protrusions 32c for aligning crimp body 32 on a tool for assembly as will be explained herein. When assembled, second end 32b of crimp body 32 traps spring 34 on splice cover 36 of connector 10.

Splice cover 36 includes a first end 36a and a second end 36b having a longitudinal passage therethrough. First end 36a is sized for crimping onto a buffer layer 90b that surrounds an optical fiber 90a of cable 90. The longitudinal passageway at second end 36b is intended to have a friction fit with ferrule 24 when connector 10 is assembled, thereby securing the same. A special tool can be used in order to accomplish this assembly step as will be discussed below. Second end 36b also includes a notch 36c for aligning the splice cover 36 with housing 40. Second end 36b has a shoulder 36d adjacent thereto that is slightly smaller than the inner diameter of spring 34 for centering the same on splice cover 36. When assembled, the fusion splice between optical fiber stub 22 and optical fiber 90a of cable 90 is disposed therein for protecting the fusion splice. Additionally, splice cover 36 includes a pair of apertures 36e for filling the longitudinal passageway of splice cover 36, thereby inhibiting movement and mechanical loads on the fusion splice. By way of example, splice cover 36 is filled with a suitable filling material such as RTV silicone that is applied using a hypodermic syringe. In other embodiments, connector 10 may be tunable for minimizing insertion loss.

Crimp body 32 and spring 34 are held on splice cover 36 when they are inserted into disposable splice cover handling block 38, thereby forming splice cover handling block subassembly 30. Disposable splice cover handling block 38 has a first end 38a and a second end 38b with a through passageway therebetween having an open side (not visible) for installing crimp body 32, spring 34, and splice cover 36. First end 38a includes a plurality of resilient fingers 38c for holding second end 38b of splice cover 36. Disposable splice cover handling block 38 also has a plurality of arms 38d at second end 38b that are used for holding crimp body 32 therein for securing the assembly therein.

Housing 40 has a first end (not numbered) and a second end (not numbered) with a longitudinal passageway therethrough. Housing also includes a pair of windows 40a near the first end for securing crimp body 32 thereto. Specifically, during assembly protrusions 32c are aligned with windows 40a and snap-fit therein to secure housing 40 with crimp body 32 that is attached to cable 90. Housing 40 also includes a keyed portion (not visible) that cooperates with notch 36c of splice cover 36 for alignment purposes. Additionally, housing 40 also has a lever 40b that is movable in a resilient fashion and used to lock and unlock connector 10 with a cooperating adapter. Trigger 50 includes a resilient lever and a pair of fingers (both not numbered). The resilient lever is used for engaging lever 40b and inhibits lever 40b from being snagged-on or tangled with cables or other devices. The fingers of trigger 50 engage grooves on the first end of housing 40 for attaching the trigger to housing 40. Trigger 50 is also configured to attach to an end of boot 70. Connector 10 may also include dust cap 80 for attaching to the connector for protecting the end of ferrule 24 during shipping or handling and must be removed before optical connection.

Figure 6A:
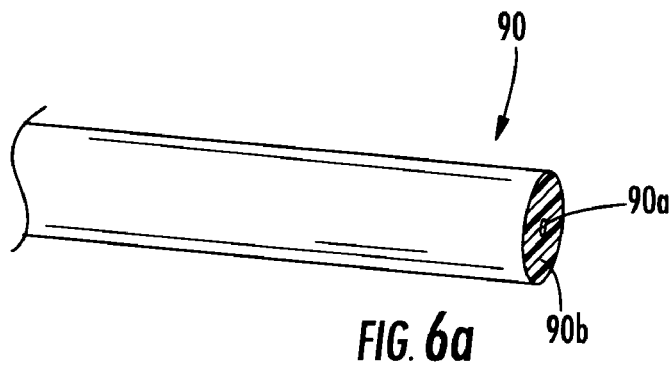
FIGS. 6a-f are a plurality of perspective views showing the steps of preparing the cable of FIG. 1 for connectorization up to the fusion spliced subassembly.
Figure 6B:
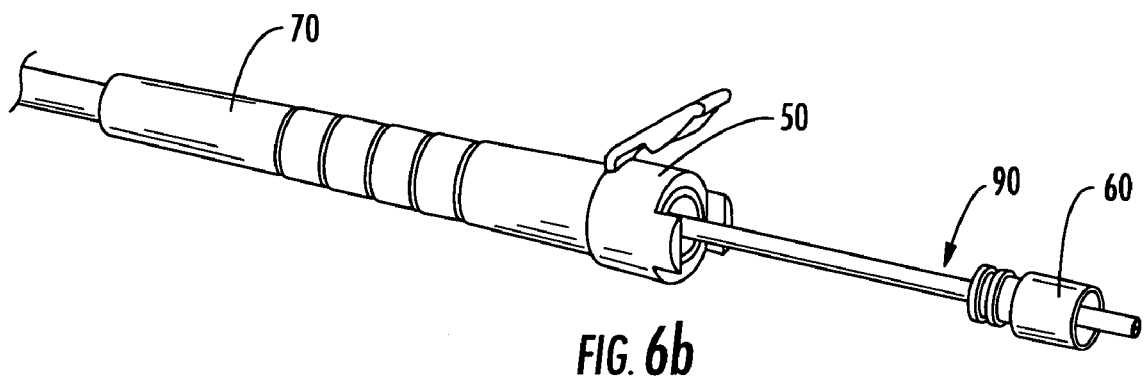
Figure 6C:
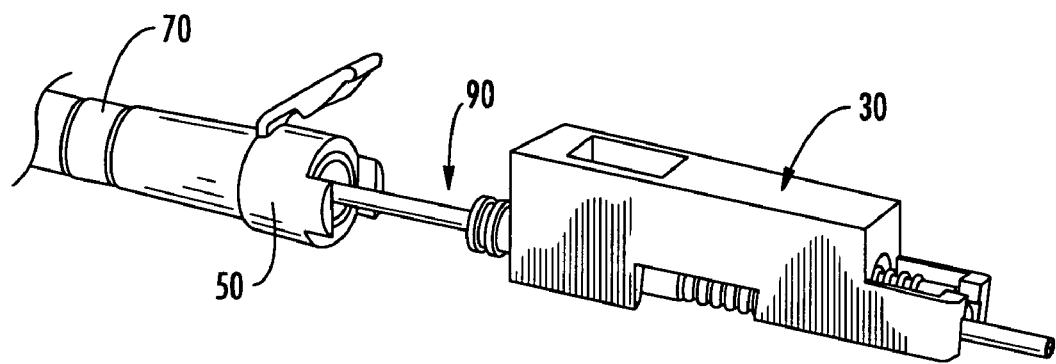
Figure 6D:
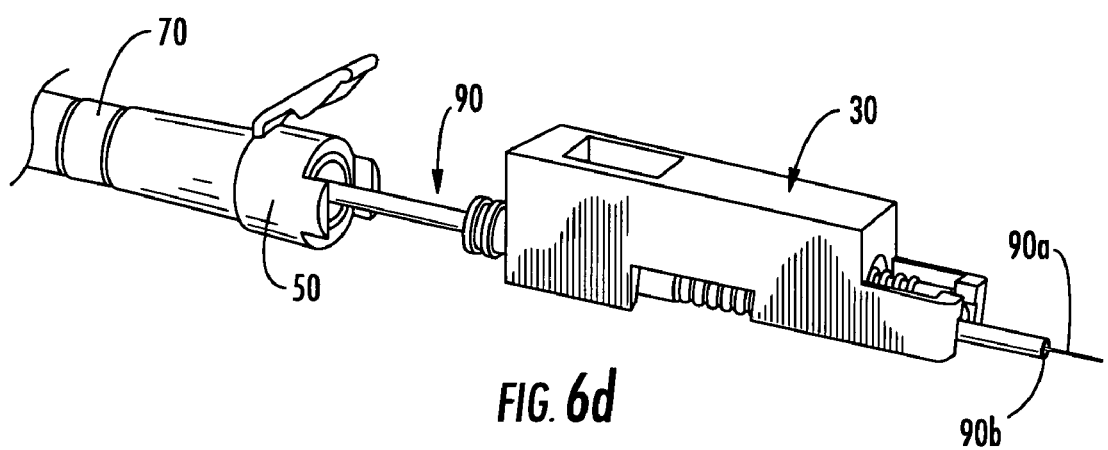
Figure 6E:
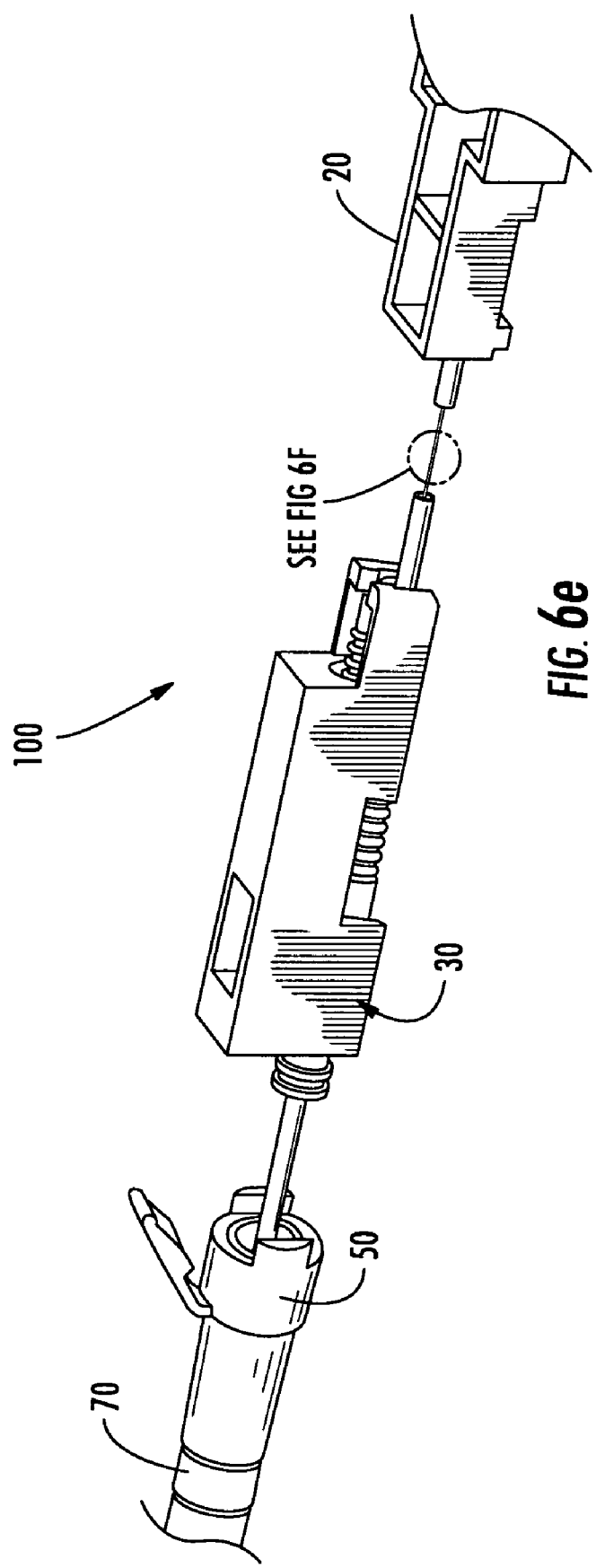
Figure 6F:
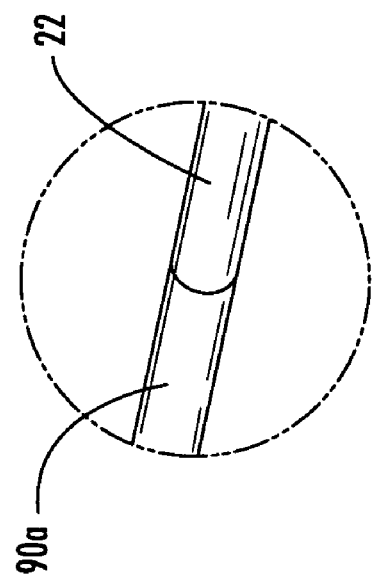

FIG. 6a is a perspective view showing cable 90 before preparation for fusion splicing. In this case, cable 90 is buffered optical fiber having optical fiber 90a and buffer layer 90b. An exemplary method of connectorizing an end of cable 90 will be explained. First, trigger 50 may be attached to an appropriate end of boot 70 or it can be attached later in the assembly process. Thereafter, boot 70 and trigger 50 are slid onto and down cable 90 followed by crimp band 60 as shown in FIG. 6b. Buffer layer 90b is then marked at a predetermined location such as about 30 millimeters from the end. As shown in FIG. 6c, splice cover handling block subassembly 30 is then slid onto and down cable 90 so that resilient fingers 38a face the end of cable 90. Afterwards, predetermined portions of buffer layer 90b along with a coating of optical fiber 90a are stripped away using an appropriate means so that a core and a cladding of optical fiber 90a remain for fusion splicing. Next, optical fiber 90a is cleaved to a suitable length, for instance, about 8 millimeters beyond buffer layer 90b as shown in FIG. 6d. Finally, an appropriate fusion splicer (not shown) is used for splicing together optical fiber 90a and fiber optic stub 22 of ferrule block subassembly 22, thereby yielding a fusion spliced subassembly 100 as shown in FIG. 6e. FIG. 6f is a view showing the fusion splice between the core and cladding of optical fiber 90a and fiber optic stub 22.

In other embodiments according to the present invention, the cable may have a plurality of strength members and a cable jacket that are cut at appropriate lengths for connectorization. If this type of cable was connectorized, the procedure would be similar to the above procedure, but the cable jacket and strength members would also be cut and split so it could be folded back out of the way. In this case, twist tie 98 of the connector kit would be used for tying and holding the jacket and strength members out of the way during the connectorization process; however, other suitable means may be used for this purpose.

Figure 7:
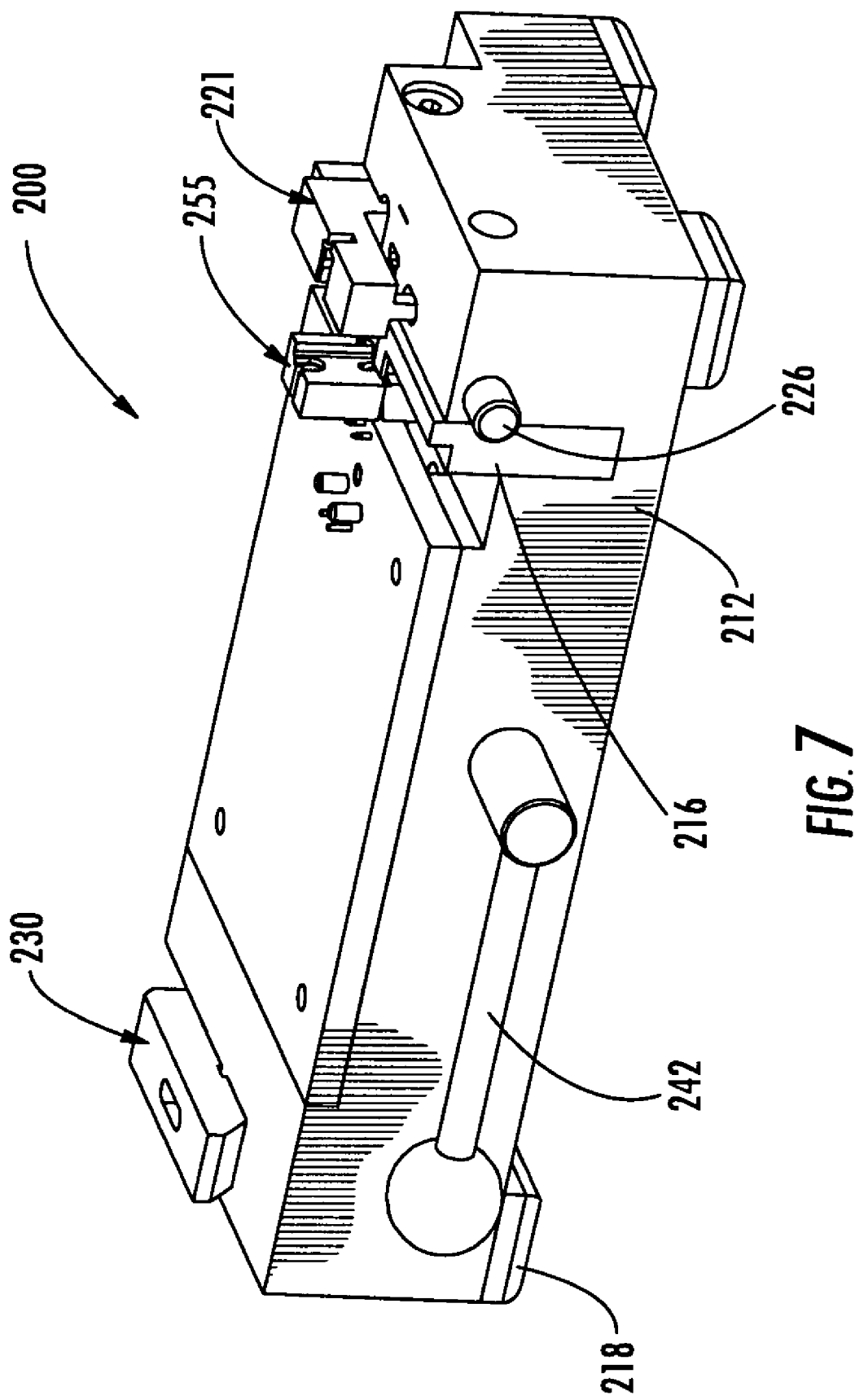
FIG. 7 is a perspective view of a press tool according to the present invention.
Figure 8:
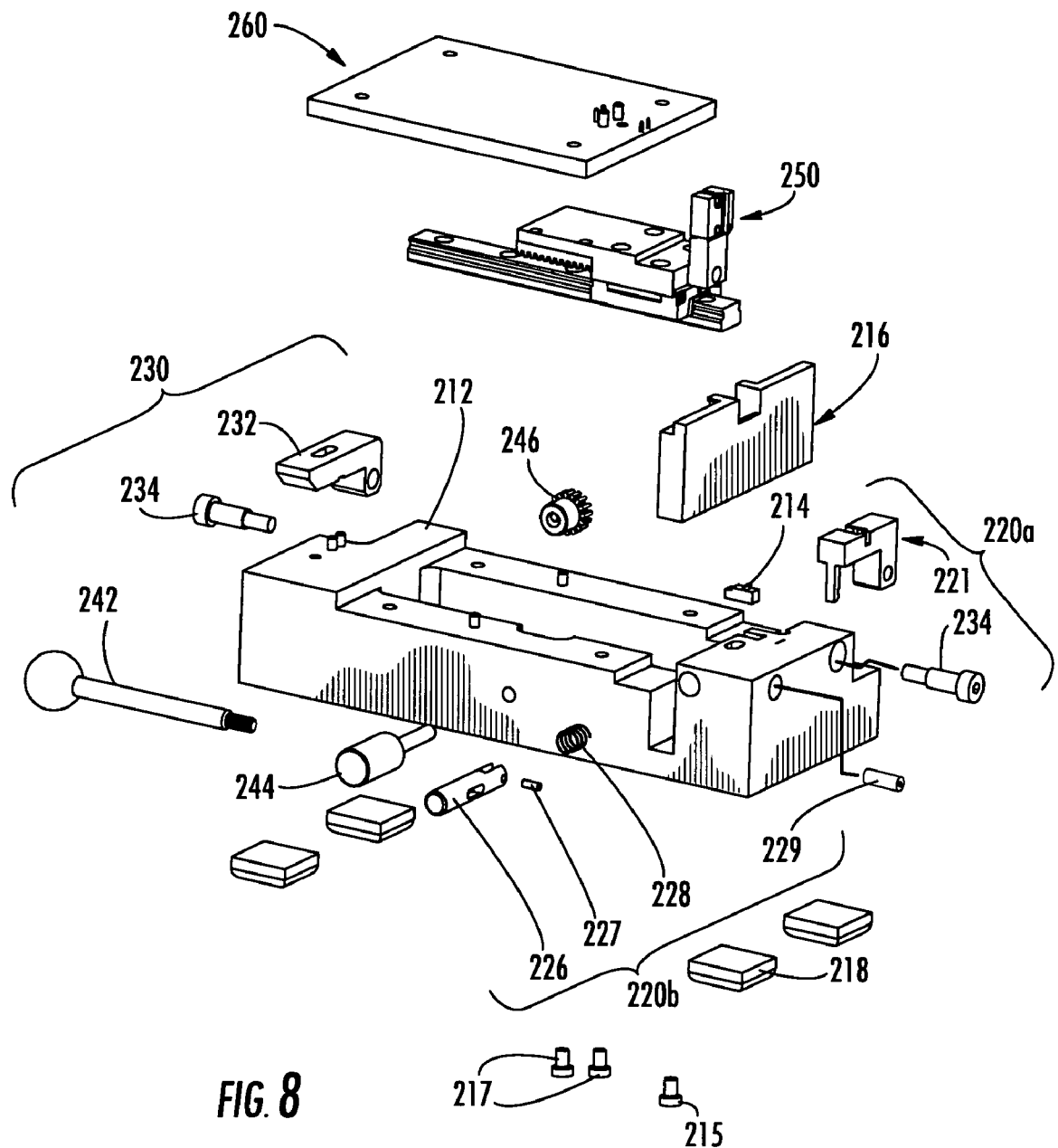
FIG. 8 is a partially exploded view of the press tool according to FIG. 7.

Another aspect of the present invention is directed to a press tool and a method of assembling connector 10 using the same. FIG. 7 shows a perspective view and FIG. 8 shows a partially exploded view of an exemplary embodiment of a press tool 200 according to the present invention. As shown in FIG. 8, press tool 200 includes a base assembly (not numbered), a ferrule door assembly 220, a cable clamp door assembly 230, an actuator assembly (not numbered), a slide assembly 250, and a cover assembly 260.

Figure 12:
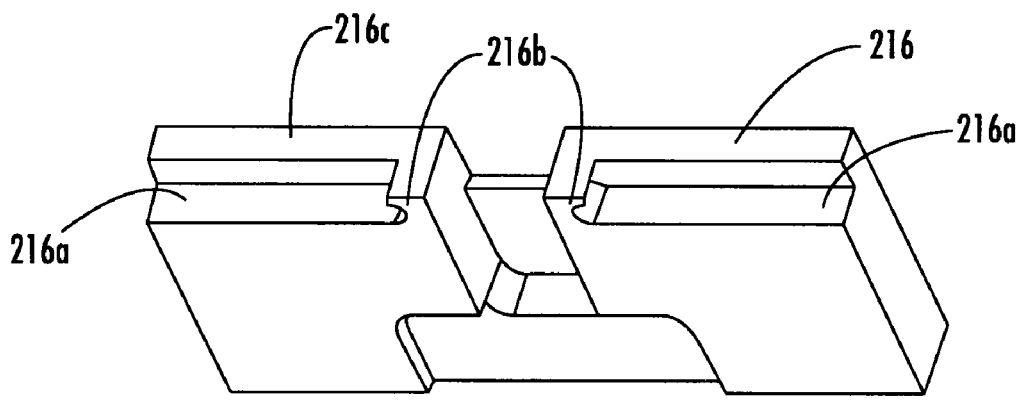
FIG. 12 is a perspective view of the saddle of the press tool of FIG. 7.
Figure 13A:
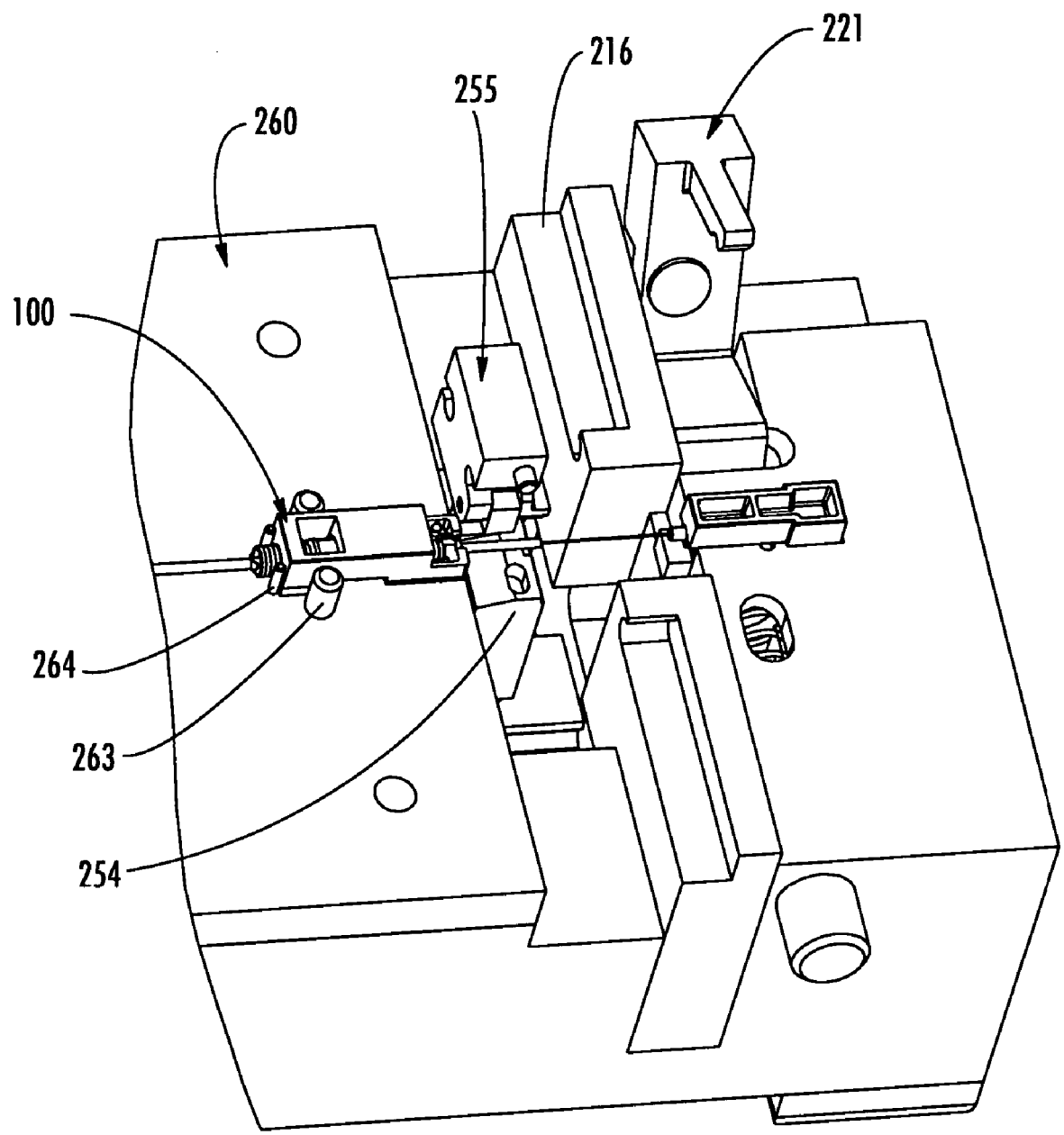
FIGS. 13a-13f depict a plurality of steps during the assembly of the connector of FIG. 1 using the press tool of FIG. 7.
Figure 13B:
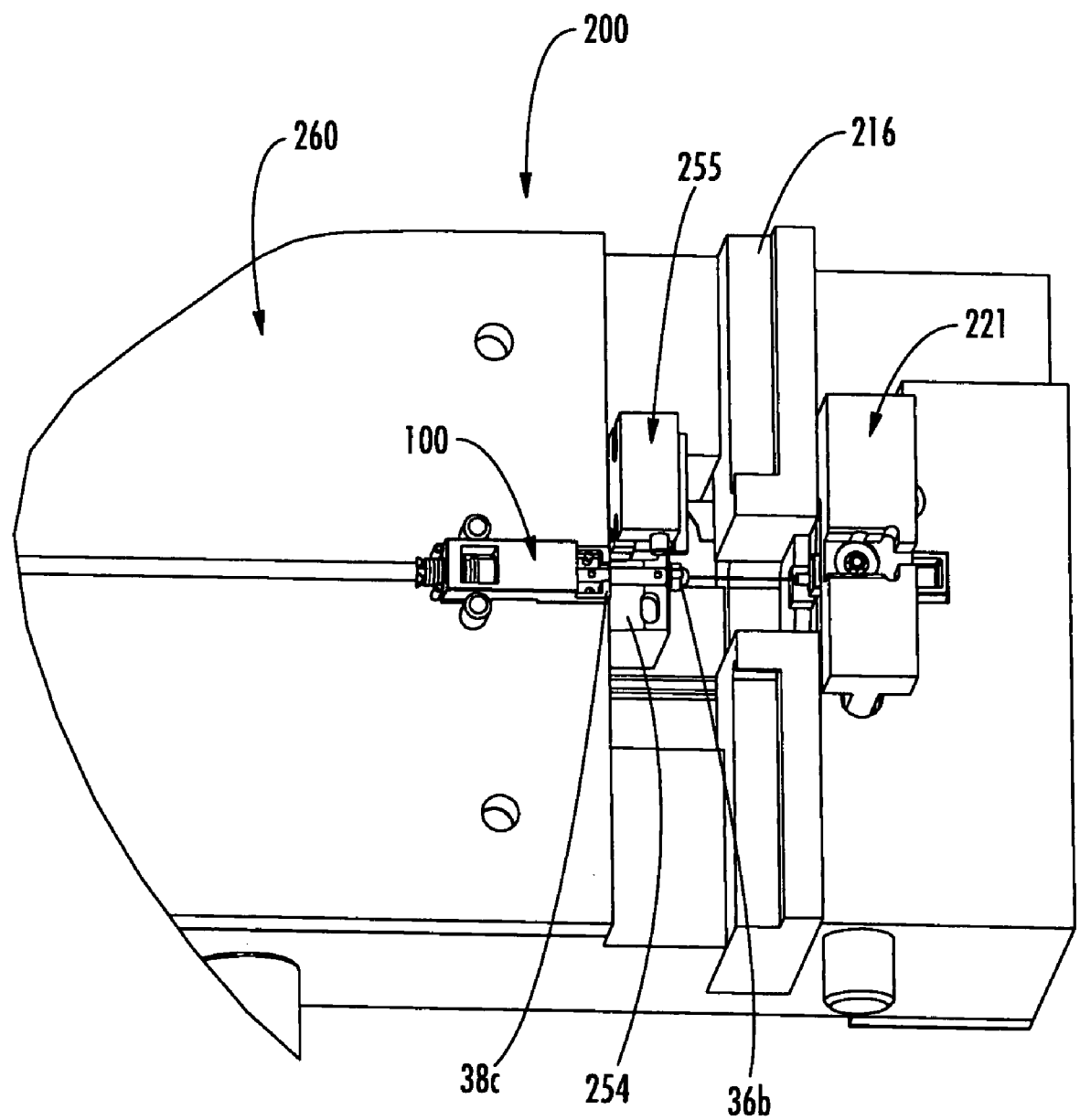

The base assembly includes a base 212, a ferrule stop 214, a saddle 216, and a plurality of footpads 218. The base assembly also has the other assemblies attached thereto, thereby forming press tool 200 as will be explained. Ferrule stop 214 and saddle 216 are respectively attached to base using a bolt 215 and a pair of bolts 217. A detailed perspective view of saddle 216 is illustrated in FIG. 12. Saddle 216 includes at least one planar surface 216a, a plurality of retention overhangs 216b, and at least one keying portion 216c. When press tool 200 is assembled the at least one planar surface 216a of saddle 216 is generally on the same plane as cover 261. As shown in FIG. 13d, alignment of the planar surfaces allows a plurality of pins 402 of a suitable crimp tool 400 to be generally horizontal, thereby correctly positioning crimp tool 400 in a perpendicular position to splice cover 36. Pins 402 of crimp tool 400 are arranged in an asymmetrical position on the same, thereby keying the crimp tool 400 to press tool 200. Retention overhangs 216b of saddle 216 are used for engaging the short side of pins 402 of crimp tool 400 so that crimp tool 400 maintains a proper position and does not lift-up during the crimping operation. Keying portion 216c keys crimp tool 400 to press tool 200 so that it can only crimp in the correct orientation and cannot crimp in a backwards orientation. Additionally, footpads 218 are attached to the bottom of base 212 for inhibiting movement of press tool 200 during operation.

Figure 9:
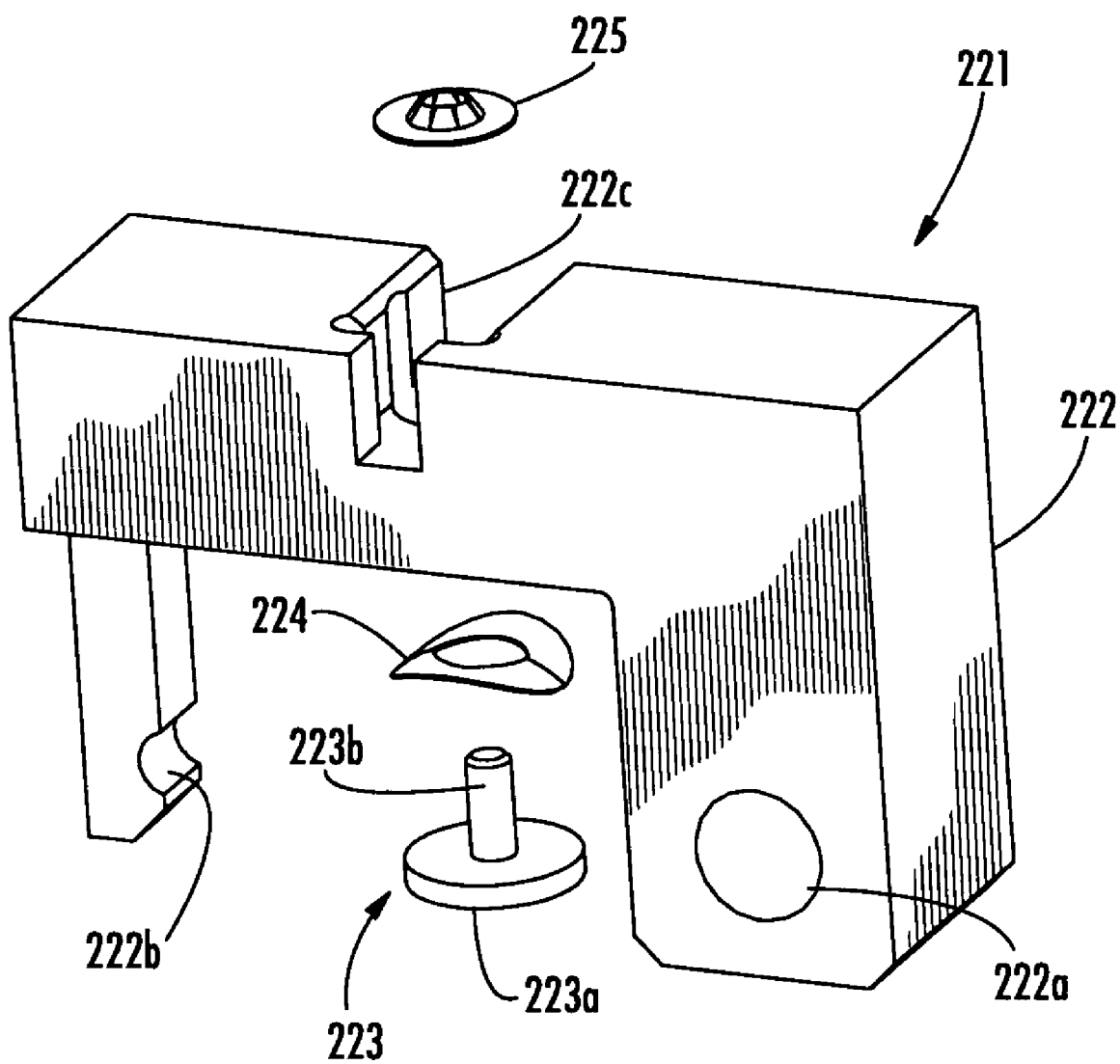
FIG. 9 is an exploded perspective view of the ferrule door subassembly of the press tool of FIG. 7.

Ferrule door assembly 220 includes a first assembly 220a and a second assembly 220b that cooperate to secure ferrule block subassembly 20 of connector 10 to base 212 during the operation of press tool 200. First assembly 220a has a ferrule door subassembly 221 and a shoulder bolt 234. Shoulder bolt 234 secures ferrule door subassembly 221 to base 212 so that the ferrule door subassembly is free to rotate when in the unlocked position. As best shown in FIG. 9, ferrule door subassembly 221 includes a ferrule door 222, a plunger 223, a spring 224, and a retainer 225. Ferrule door 222 has a through bore 222a, an arm (not numbered) having a locking catch 222b, and a cutout 222c having a predetermined shape on its top surface. Bore 222a is sized for the shoulder of bolt 234 and acts as the pivot point for ferrule door subassembly 221. Locking catch 222b is used for engaging a portion of second assembly 220b, thereby locking ferrule door subassembly 221 in a closed position. Cutout 222c has a shape that is generally complementary to the profile of housing 40 of connector 10 and its use will be described later.

Plunger 223 of ferrule door subassembly 221 is biased downward for applying a downward force to ferrule block subassembly 20 when ferrule door subassembly 221 is in the locked position. Specifically, plunger 223 has a planar portion 223a and a shaft portion 223b. In use, planar portion 223a applies the downward force to ferrule block subassembly 20, thereby holding the same in a fixed position during use. Spring 224 is used to apply the downward force and in this case is a disk spring. Shaft portion 223b of plunger 223 passes through a vertical bore (not visible) of ferrule door 222 and is secured to ferrule door by retainer 225.

Second assembly 220b of ferrule door assembly 220 cooperates with first assembly 220a and is used for locking ferrule door subassembly 221 in a closed position. Specifically, first and second assemblies 220a,220b engage each other at an intersection of a vertical bore and a horizontal bore (not numbered) in base 212 as will be described. Second assembly 220b includes a locking shaft 226, a pin 227, a spring 228, and a retaining screw 229. Locking shaft 226 includes a notched end (not numbered) having a bore therethough for receiving pin 227. Additionally, locking shaft 226 includes a medial notch (not numbered) for retaining locking shaft 226 within the horizontal bore of base 212 and allowing a predetermined range of motion. Spring 228 is inserted into horizontal bore of base 212 and biases locking shaft 226 in an outward direction. Locking shaft 226 and pin 227 are inserted into the horizontal bore until the medial notch is aligned with the threaded bore on base 212, then retaining screw 229 is inserted and threaded into base 212. Thus, retaining screw 229 allows locking shaft to have a limited range of motion defined by the medial notch while spring 228 biases locking shaft 226 and pin 227 in an outward direction.

When rotating ferrule door subassembly 221 into the closed position, the arm of ferrule door subassembly 221 enters the vertical bore of base 212. The vertical bore is positioned on base 212 such that the notched end of locking shaft 226 and pin 227 are positioned at the intersection of the vertical and horizontal bores of base 212. Consequently, during closing of the ferrule door subassembly 221 the tapered portion of its arm engages pin 227, thereby pushing locking shaft 226 inward against spring 228. When pin 227 passes over the tapered portion of the arm and into locking catch 222b of ferrule door 222 spring 228 biases locking shaft 226 in the outward direction, thereby locking ferrule door subassembly 221 in the closed position. Opening ferrule door subassembly 221 requires the craftsman to push locking shaft 226 inward, while rotating ferrule door subassembly until locking catch 222b disengages pin 227.

Press tool 200 may also include a cable clamp door assembly 230 that is used for positioning and clamping the cable during use of press tool 200. Cable clamp door assembly includes a cable clamp door 232 and a shoulder bolt 234. Cable clamp door 232 includes a through bore (not numbered) sized for the shoulder of shoulder bolt 234 and acts as the pivot point for cable clamp door 232. Base 212 includes a threaded bore (not visible) for attaching shoulder bolt 234 thereto. Additionally, base 212 includes a plurality of pins (not numbered) adjacent to cable clamp door assembly 230. The plurality of pins are used for positioning the cable therebetween before closing of the cable clamp door 232, thereby securing the cable during use of press tool 200.

Press tool 200 also includes an actuator assembly (not numbered) that drives a slide assembly 250 used for assembling ferrule 24 with splice cover 36 of connector 10. In this embodiment of press tool 200, slide assembly 250 is also useful for installing housing 40 of connector 10 as will be discussed herein. Of course, other suitable means are possible for driving slide assembly 250. For instance, slide assembly 250 can include a fixed handle thereon for moving the same in a linear fashion.

In this case, the actuator assembly includes a handle 242, a shaft 244, and a pinion gear 246 for driving slide assembly 250. Handle 242 includes a threaded end that engages a threaded bore of shaft 244. Shaft 244 has a stepped down diameter portion that is sized to fit into a bore hole (not numbered) in base 212 and extend therebeyond so that shaft 244 can rotate relative to base 212. Specifically, the stepped down diameter portion of shaft 244 extends into a cavity (not numbered) of base 212 so that pinion gear 246 can be attached thereto by suitable means. Thus, rotating handle 242 causes pinion gear 246 to also rotate, thereby causing a portion of slide assembly 250 to move in linear fashion.

Figure 10:
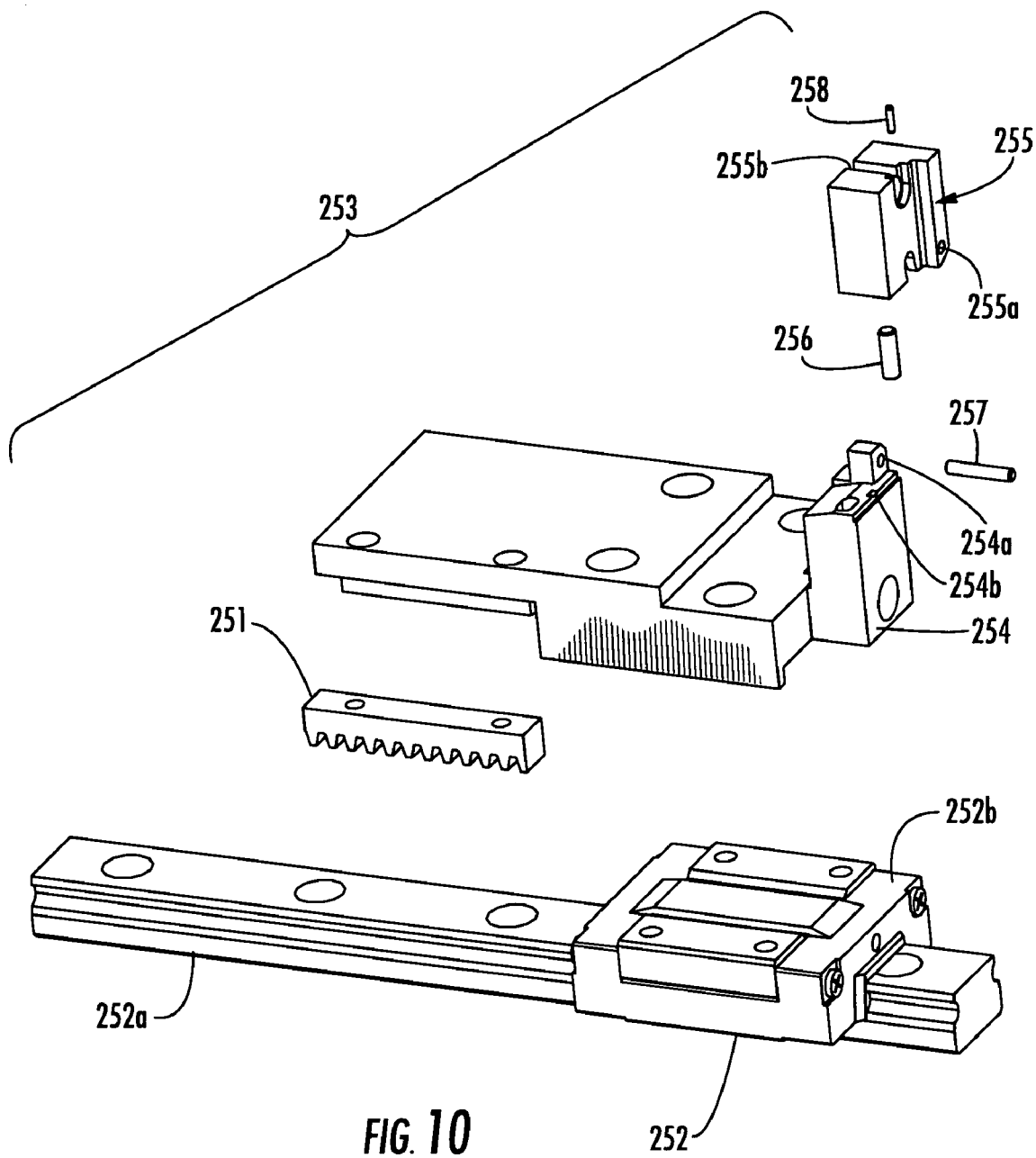
FIG. 10 is an exploded perspective view of the slide assembly of the press tool of FIG. 7.

FIG. 10 depicts slide assembly 250 of press tool 200. Slide assembly 250 fits within the cavity of base 212 and is secured thereto using bolts (not shown). Slide assembly 250 includes a linear slide 252 and a slide adapter assembly 253. Linear slide 252 includes a guide 252a and slide 252b that moves along guide 252a. When attached slide assembly 250 is secured to base 212, gear rack 251 of slide assembly 250 engages pinion gear 246 so that when handle 242 is rotated slide adapter assembly 253 and slide 252b moves along guide 252a of slide assembly 250 in a linear fashion.

Slide adapter assembly 253 includes a gear rack 251, a sliding portion 254, a slide adapter door 255, a stop pin 256, a hinge pin 257, and an alignment pin 258. Gear rack 251 attaches to sliding portion 254 using a plurality of bolts (not shown) and sliding portion 254 attaches to slide 252b using bolts (not shown). Slide adapter door 255 attaches to sliding portion 254 using hinge pin 257 so that adapter door 255 is rotatable about hinge pin 257. Specifically, slide adapter door 255 is positioned so that a bore 255a and a bore 254a are aligned and hinge pin 257 is insert through the aligned bores 254a,255a. Stop pin 256 is pressed into a suitable bore (not visible) on the bottom side of slide adapter door 255 and has a complementary opening on sliding portion 254. Stop pin 256 reduces the rotational force that can be applied to the hinge area of slide adapter door 255 when a lateral force is applied to slide adapter door 255. In other words, stop pin 256 provides a second point for lateral force transfer, thereby inhibiting twisting forces from being applied to the hinge portion of slide adapter door 255. Alignment pin 258 is pressed into a suitable bore (not visible) on the top side of slide adapter door 255 so that a portion thereof protrudes from the same. Alignment pin is used for positioning crimp body 32 into a cutout 255b on the top of slide adapter door 255. More specifically, the protruding portion of alignment pin 258 is intended to align the notch on the rearward ridge of crimp body 32 so that protrusions 32c are aligned with windows, Thus, press tool 200 is also suitable for attaching crimp body 32 that is attached to cable 90 with housing 40.

Figure 11:
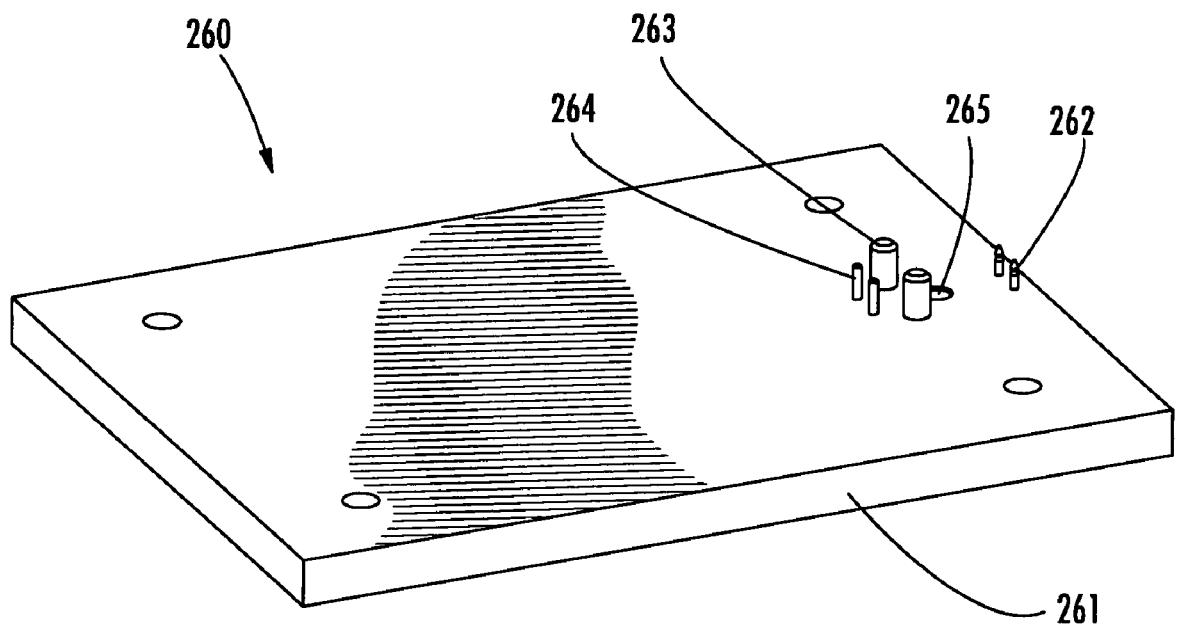
FIG. 11 is a perspective view of the cover assembly of the press tool of FIG. 7.

Press tool 200 also includes cover assembly 260 that attaches to base 212 using bolts (not shown). As best shown in FIG. 11, cover assembly 260 includes cover 261, a plurality of release pins 262, a plurality of side alignment pins 263, a plurality of rear alignment pins 264, and a magnet 265. Release pins 262 are pressed into respective angled bores of cover 261 so that release pins 262 have an angle of about ten degrees in an outward direction. Side and rear alignment pins 263,264 are alignment features that are pressed into respective perpendicular bores of cover 261. Side and rear alignment pins 263,264 are used for aligning splice cover handling block subassembly 30 on cover assembly 260 during the assembly process. However, other suitable alignment features such as a recess in the cover 261 can accomplish the same function. Specifically, when splice cover handling block subassembly is positioned along side and rear alignment pins 263,264 and pushed down to cover 261, respective release pins 262 engage resilient fingers 38c of disposable splice cover handling block 38, thereby spreading resilient fingers 38c outward due to their angled arrangement. Consequently, splice cover 36 is freed from disposable splice cover handling block 38 and spring 34 pushes second end 32b of splice cover 36 beyond resilient fingers 38c as best shown in FIG. 13b. Additionally, magnet 265 inhibits spring 34 of splice cover handling block subassembly from following splice cover 36, thereby keeping spring 34 out of the way.

The use of press tool 200 for aiding in the assembly of connector 10 will now be described. FIGS. 13a-13f depict several steps using press tool 200 starting with assembly 100 and proceeding towards the assembled connector 10 depicted in FIG. 1. FIG. 13a shows assembly 100 placed in press tool 200. Assembly 100 may be moved from the fusion splicer to press tool 200 using a transfer tool 300 as shown in FIGS. 14 and 14a. Transfer tool 300 includes a first arm 302, a second arm 304, a pivot 306, and a resilient member 308. First and second arms 302,304 have respective pivot portions (both not numbered) for engaging and rotating about pivot 306. Additionally, first and second arms 302,304 include respective grooves 302a,304a for locating and securing portions of resilient member 308 therein. Resilient member 308 biases first and second arms 302,304 together about pivot 306, thereby enabling transfer tool 300 to grip and hold assembly 100 as shown in FIG. 15. Thus, inhibiting the disturbance of the fusion splice of assembly 100 during the transfer of assembly 100 from the fusion splicer to press tool 200. In this case, resilient member 308 is a resilient band; however, other suitable resilient members like springs may be used. First and second arms 302,304 respectively having a first gripping portion 302b,304b and a second gripping portion 302c,304c that are spaced apart at a predetermined distance that corresponds with the spacing of ferrule block subassembly 20 and splice cover handling block subassembly 30 of assembly 100. Additionally, respective first and second gripping portions 302b, 304b, 302c, 304c include respective cutouts (not numbered) that are respectively complementary to portions of ferrule block subassembly 20 and splice cover handling block subassembly 30. FIG. 15 depicts assembly 100 being held by transfer tool 300. Of course, it is possible to transfer assembly 100 from the fusion splicer to press tool 200 without the use of transfer tool 300.

FIG. 13a depicts assembly 100 being placed on press tool 200. Specifically, ferrule door subassembly 221 and slide adapter door 255 are in the open position so assembly 100 can be aligned onto side and rear alignment pins 263,264 and a protrusion of ferrule stop 214. Additionally, sliding portion 254 is in the retracted position with the handle in the rearward position as shown in FIG. 7. FIG. 13b shows ferrule door subassembly 221 being closed in the locked position, thereby holding ferrule block subassembly 20 against ferrule stop 214. As best shown in FIG. 13e, disposable ferrule handling block 28 is positioned so that it straddles a protrusion (not numbered) of ferrule stop 214. As shown in FIG. 13b, after splice cover handling block subassembly 30 is pushed down to cover 260, resilient fingers 38c are pushed outward, thereby allowing the second end 36b of splice cover 36 to escape from splice cover handling block subassembly 30. In this case, splice cover 36 should be placed so that shoulder 36d is properly positioned on a cutout 254b of slidable portion 254 as best shown in FIG. 10.

Thereafter, slide adapter door 255 is rotated to the closed position and stop pin 256 engages a complementary opening (not numbered) in slidable portion 254, thereby holding splice cover 36 so that it is movable with slidable portion 254 that is a portion of slide adapter assembly 253.

Figure 13C:
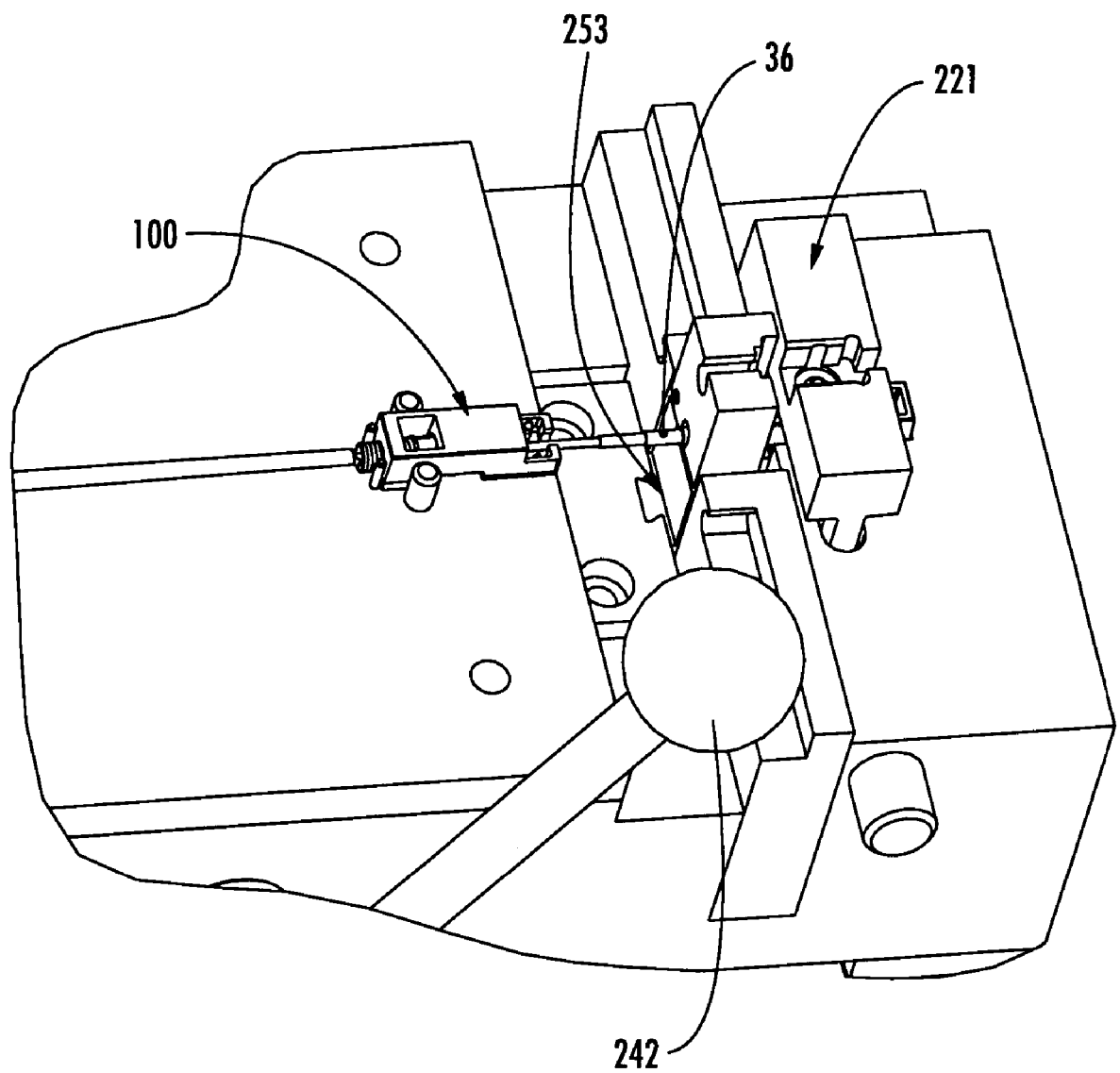
Figure 13D:
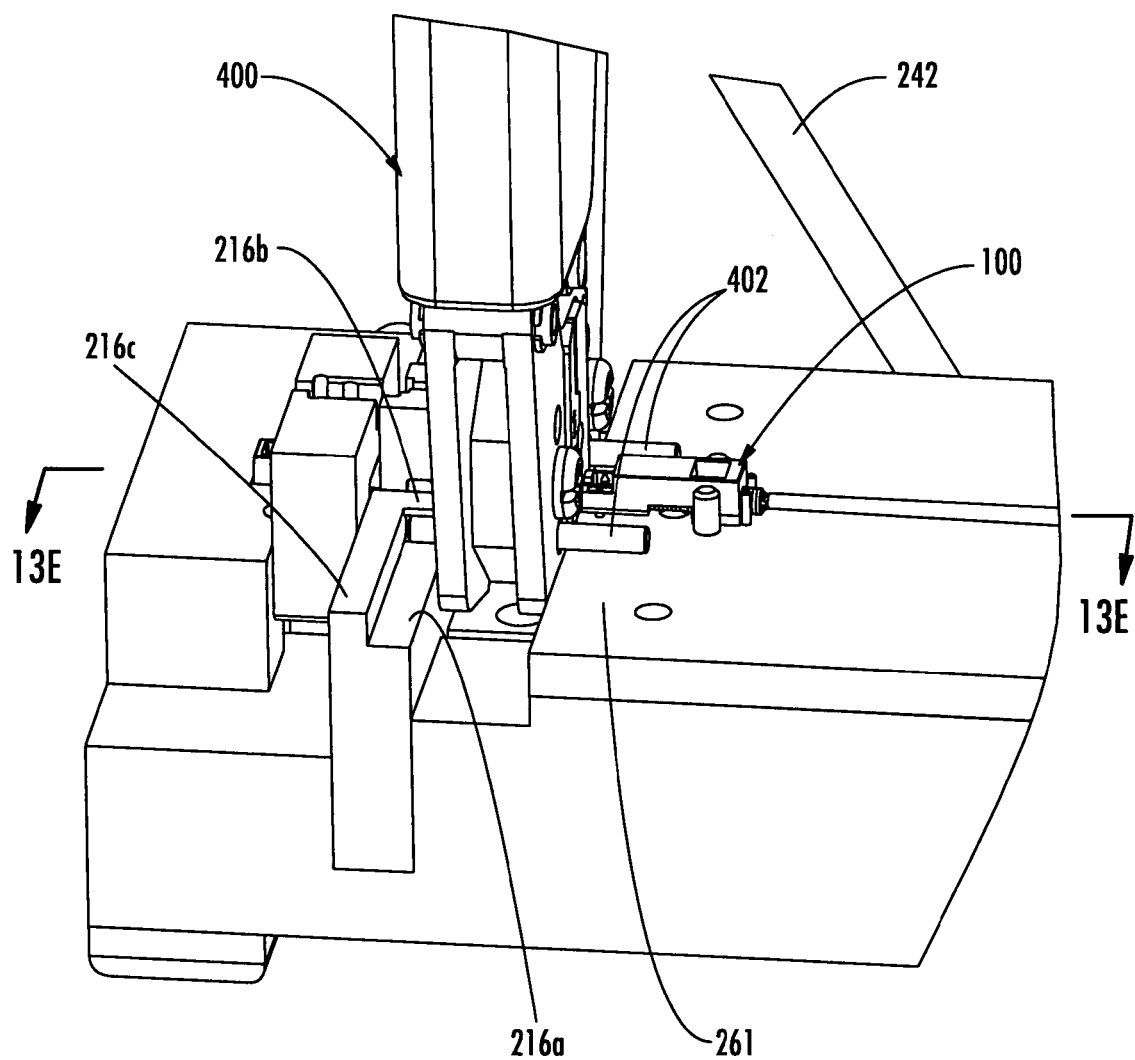
Figure 13E:
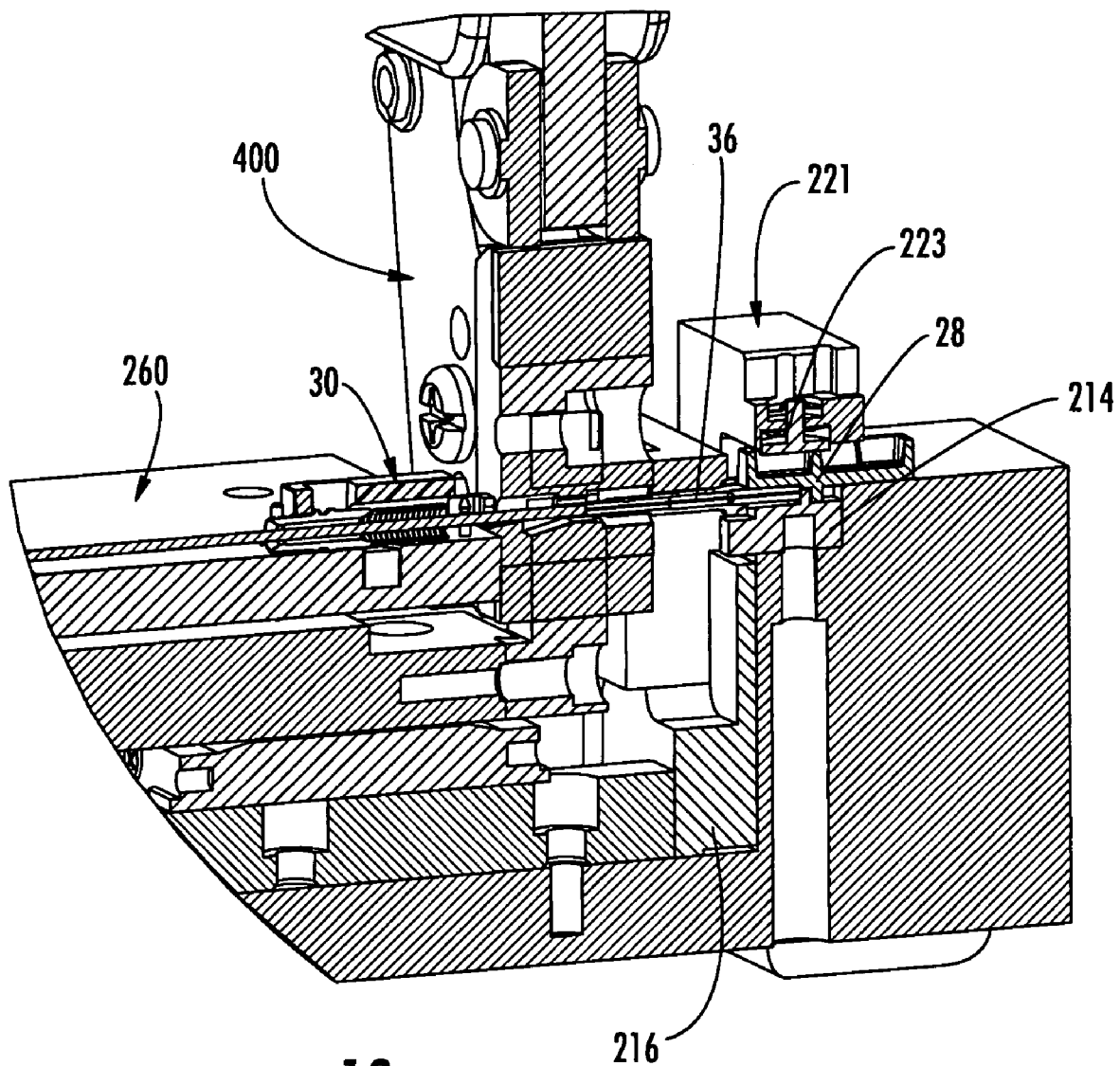
Figure 14:
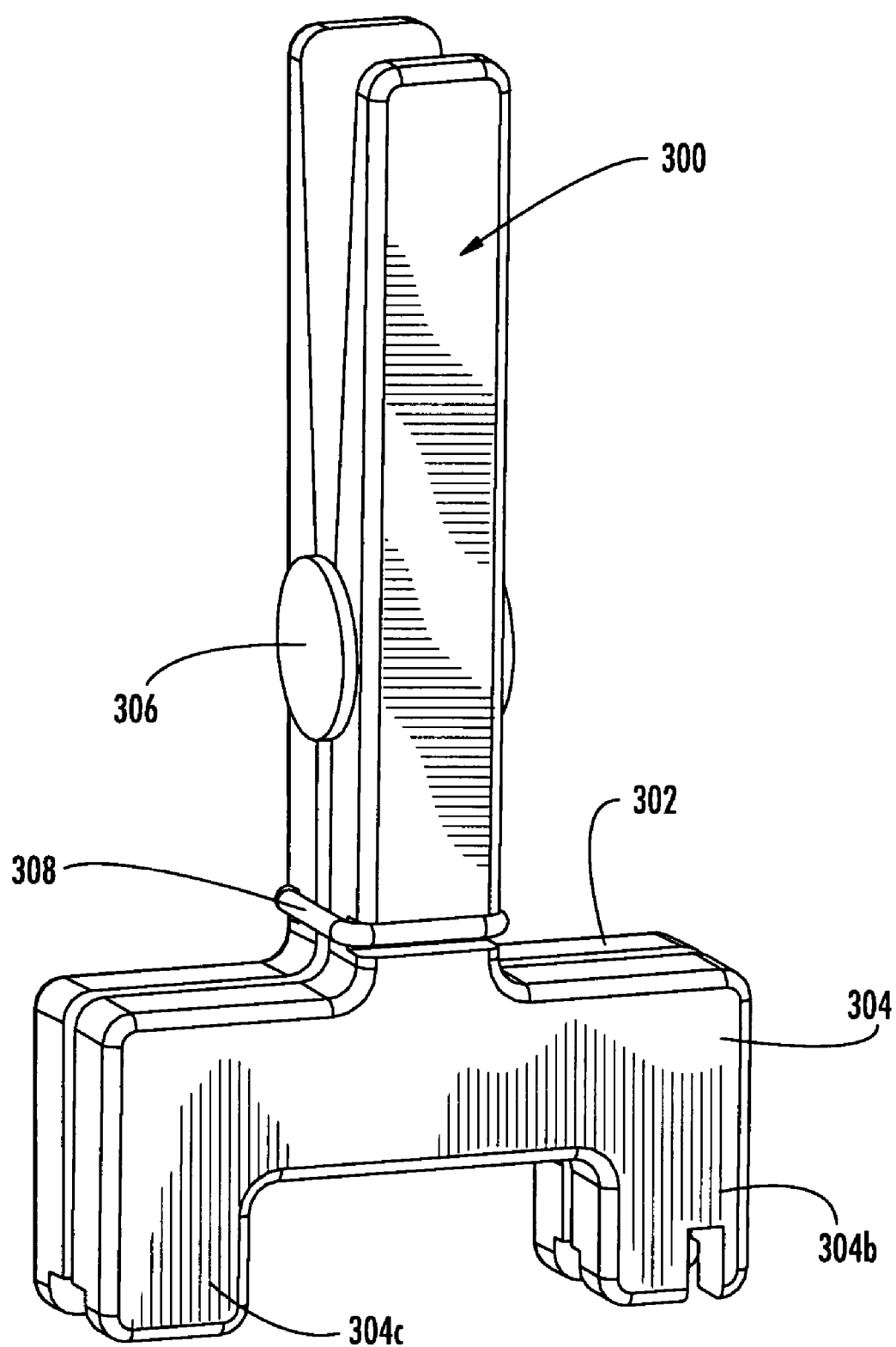
FIGS. 14 and 14a respectively are a perspective and an exploded view of a transfer tool according to the present invention.
Figure 14A:
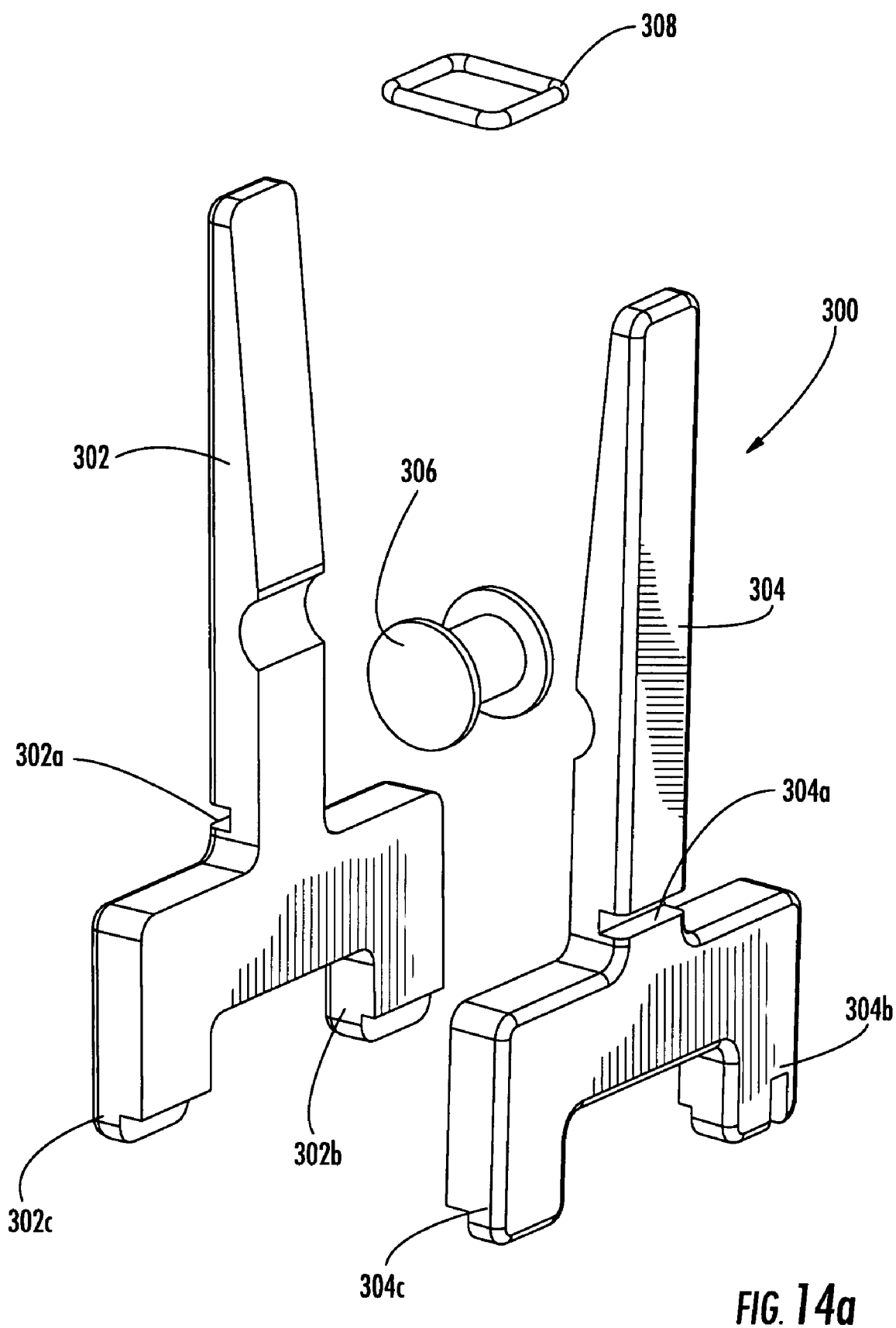

As shown in FIG. 13c, handle 242 of the actuator assembly is moved to a forward position, thereby moving slidable portion 254 that is holding splice cover 36 towards ferrule block subassembly 20 being held by ferrule door subassembly 221. In other words, the ferrule holder portion of splice cover 36 is aligned with ferrule 24 of ferrule block subassembly so that splice cover 36 is pressed onto ferrule 24. Moreover, splice cover 36 moves relative to cable 90 and is positioned over the fusion splice. In this case, since ferrule 24 is relatively small making it difficult to grasp, align, and assemble; however, using press tool 200 makes this assembly task simple and reliable.

The next step is securing splice cover 36 to cable 90 while slidable portion 254 is in the forward position in order to access first end 36a of splice cover 36. FIG. 13d and 13e depict a suitable crimp tool 400 for securing a first end 36a of splice cover 36 to buffer layer 90b. For the purpose of clarity, components such as bolt 215 are not show in FIG. 13e. Crimp tool 400 includes pins 402 that are asymmetrically positioned on crimp tool 400 for keying, aligning, and maintaining the position of crimp tool 400 during the crimp operation. Specifically, the long end of pins 402 ride on cover 216 and the short end of pins 402 ride on planar surface 216a of saddle 216. Saddle 216 also includes at least one keying portion 216c that creates a ledge so that crimp tool 400 only fits on press tool 200 in one orientation. As shown, keying portion 216c only permits the short ends of pins 402 to ride on planar surface 216a. Furthermore, saddle 216 includes a plurality of retention overhangs 216b so that as crimp tool 400 engages first end 36a of splice cover 36 the short ends of pins 402, thereby preventing crimp tool from moving upward during the crimping operation. Then crimp tool 400 is removed and handle 242 is returned to the rearward position. Then, ferrule door 222, cable clamp door 232, and slide adapter door 255 are rotated to the open position to release cable 90 and an intermediate assembly can be removed from press tool 200. Thereafter, disposable ferrule handling block 28 and disposable splice cover handling block 38 are removed from the intermediate assembly.

Figure 13F:
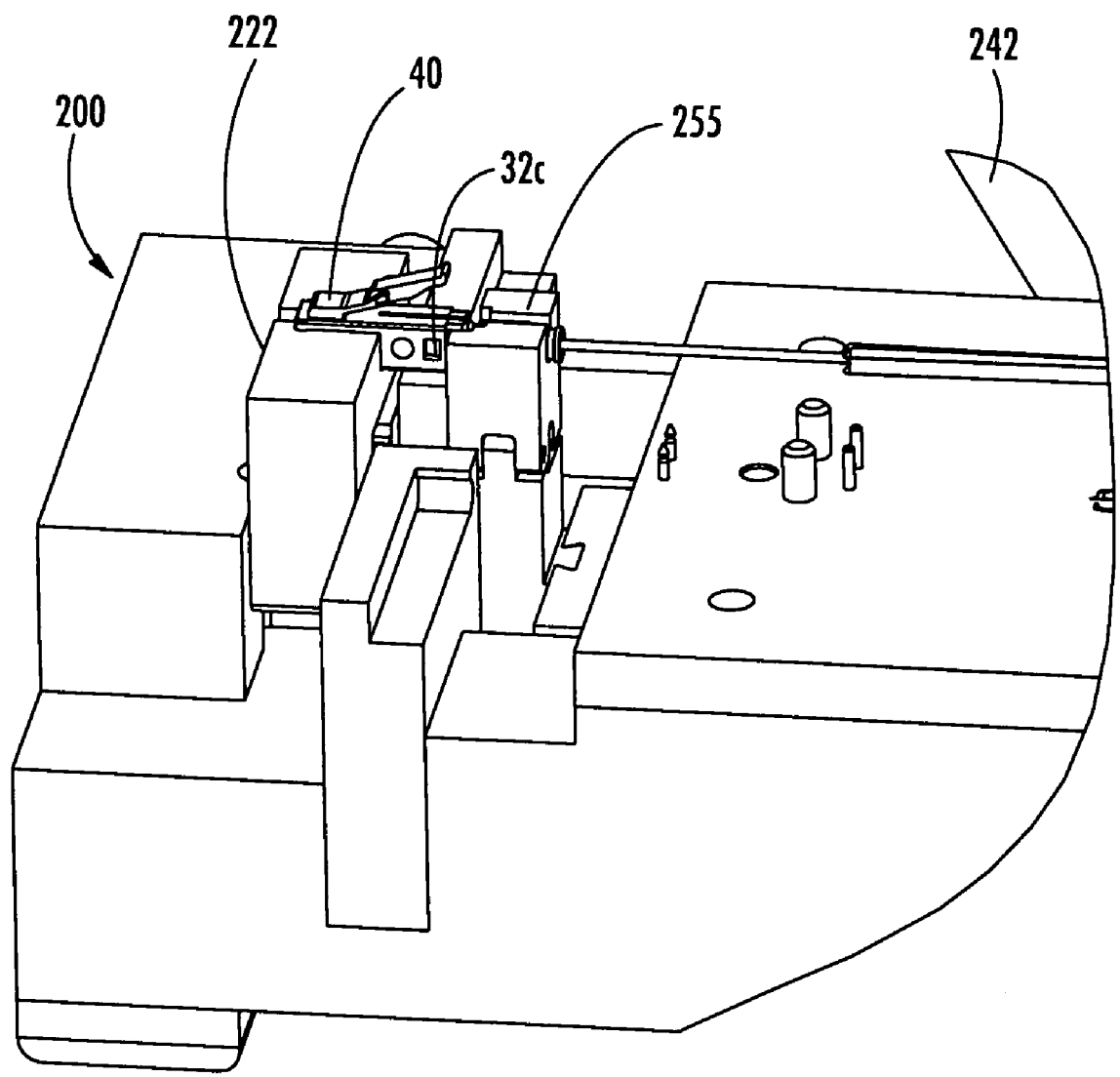

Press tool 200 is also advantageous since it allows the assembly of housing 40 to the intermediate assembly. As shown in FIG. 13f a portion of housing 40 fits into cutout 222c on ferrule door 222 and a portion of intermediate assembly fits into cutout 255b on slide adapter door 255. Specifically, the notch in the rearward ridge of crimp body 32 is positioned on alignment pin 258 of slide adapter door 255, thereby aligning protrusions 32c of splice cover 32 with windows 40a of housing 40. Then handle 242 is moved to the forward position until protrusions 32c and windows 40a engage, thereafter a nearly completed connector assembly is removed from press tool 200. Finally, crimp band 60 and boot 70 are installed.

Many modifications and other embodiments of the present invention, within the scope of the appended claims, will become apparent to a skilled artisan. For example, connectors according to the present invention can have more than one fiber or different numbers of parts. Likewise, press tools and transfer tools according to the present invention can have different components, configurations, or different numbers of parts. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation.

That which is claimed:

1. A field-installable fusion spliced optical fiber connector, comprising:
   a ferrule defining a longitudinal bore therethough and an end face;
   a fiber optic stub disposed within the longitudinal bore and defining a first end and a second end, wherein the first end extends beyond the end face of the ferrule;
   a splice cover coupled to the ferrule and defining a longitudinal passage therethrough;
   a crimp body coupled to the splice cover;
   a spring positioned between the crimp body and the splice cover; and
   a connector housing;
   wherein a ferrule handling block holds the ferrule during connector assembly;
   wherein a splice cover handling block holds the crimp body, the splice cover and the spring during connector assembly; and
   wherein a fusion splice point of the fiber optic stub and a field fiber is positioned within the longitudinal passage of the splice cover.

2. The fiber optic connector according to claim 1, wherein the splice cover handling block defines a plurality of resilient fingers.

3. The fiber optic connector according to claim 1, further comprising a crimp band crimped about the crimp body.

4. The fiber optic connector according to claim 1, wherein one end of the splice cover is crimped.

5. The fiber optic connector according to claim 1, further comprising a trigger.

* * * * *